US012713394B2

(12) United States Patent
Ying et al.

(10) Patent No.: US 12,713,394 B2
(45) Date of Patent: Aug. 18, 2026

(54) METHOD, APPARATUS, AND SYSTEM FOR DETERMINING PAGING OCCASION OF TERMINAL

(71) Applicant: HUAWEI TECHNOLOGIES CO., LTD., Shenzhen (CN)

(72) Inventors: Jiangwei Ying, Beijing (CN); Yanmei Yang, Beijing (CN); Shengfeng Xu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 932 days.

(21) Appl. No.: 17/707,266

(22) Filed: Mar. 29, 2022

(65) Prior Publication Data

US 2022/0225275 A1 Jul. 14, 2022

Related U.S. Application Data

(63) Continuation of application No. PCT/CN2019/109748, filed on Sep. 30, 2019.

(51) Int. Cl.
*H04W 68/02* (2009.01)
*H04W 8/02* (2009.01)
(Continued)

(52) U.S. Cl.
CPC ............. *H04W 68/02* (2013.01); *H04W 8/02* (2013.01); *H04W 68/005* (2013.01); *H04W 88/06* (2013.01)

(58) Field of Classification Search
CPC ..... H04W 68/005; H04W 68/02; H04W 8/02; H04W 8/183; H04W 8/26; H04W 88/06;
(Continued)

(56) References Cited

U.S. PATENT DOCUMENTS 12,089,180 B2 * 9/2024 Stojanovski .......... H04W 24/08
2010/0240420 A1 9/2010 Chin et al.
(Continued)

FOREIGN PATENT DOCUMENTS

CN 102421191 A 4/2012
CN 102546918 A 7/2012
(Continued)

OTHER PUBLICATIONS

India Office Action issued in corresponding India Application No. 202227021011, dated Mar. 27, 2023, pp. 1-6.
(Continued)

*Primary Examiner* — Dionne Pendleton
(74) *Attorney, Agent, or Firm* — HAUPTMAN HAM, LLP

(57) ABSTRACT

A terminal includes a first universal subscriber identity module (USIM) and a second USIM. A method for determining a paging occasion (PO) of the terminal includes, in response to a first PO of the first USIM being the same as a PO of the second USIM, sending, by the terminal, indication information to a mobility management network element communicating with the first USIM. The indication information is used to indicate that POs of at least two USIMs in the terminal are the same. The method also includes receiving, by the terminal, a first parameter from the mobility management network element. The method further includes determining, by the terminal, a second PO of the first USIM based on the first parameter. The second PO of the first USIM is different from the PO of the second USIM.

20 Claims, 16 Drawing Sheets

(51) Int. Cl.
*H04W 68/00* (2009.01)
*H04W 88/06* (2009.01)

(58) Field of Classification Search
CPC ..... H04W 24/08; H04W 48/16; H04W 76/11; H04W 76/27; H04W 76/30; H04W 8/08; H04W 60/005; H04W 60/04; H04W 68/025; H04W 76/16; H04W 48/18; H04W 60/00; H04W 68/12; H04W 84/042; H04W 12/06; H04W 12/068; H04W 48/17; H04W 68/00; H04W 76/10; H04W 76/34; H04W 8/20; H04W 12/037; H04W 12/0431; H04W 24/02; H04W 36/322; H04W 4/14; H04W 4/60; H04W 68/04; H04W 68/06; H04W 68/08; H04W 76/15; H04W 76/19; H04W 76/20; H04W 76/22; H04W 76/28; H04W 8/18; H04W 8/22; H04W 8/24; H04W 88/14; H04W 12/45; H04W 4/90; H04W 48/14; H04W 60/02; H04W 60/06; Y02D 30/70
See application file for complete search history.

(56) References Cited

U.S. PATENT DOCUMENTS

2020/0396591 A1* 12/2020 Ou .................... H04W 76/30
2022/0240213 A1* 7/2022 Ly ..................... H04W 4/14
2022/0264522 A1* 8/2022 Brusilovsky .......... H04W 48/18

FOREIGN PATENT DOCUMENTS

CN 104126325 A 10/2014
CN 106470481 A 3/2017
CN 110149695 A 8/2019
WO 2017136078 A1 8/2017

OTHER PUBLICATIONS

SA1 (from S1-190494), new SID: Study on Support for Multi-USIM Devices (FS_MUSIM). 3GPP TSG SA Meeting #83, Shenzhen, P. R. China, Mar. 20-22, 2019, SP-190091, 3 pages.
SA WG2, Revised SID: Study on system enablers for multi-SIM devices. TSG SA Meeting #SP-83, Mar. 20-22, 2019, Shenzhen, China, SP-190248, 4 pages.
International Search Report issued in corresponding International Application No. PCT/CN2019/109748, dated Jun. 29, 2020, pp. 1-9.
Qualcomm Incorporated et al: "Avoidance of paging collisions to minimize outage of services",3GPP Draft; S2-174243,Jun. 25, 2017, XP051303098,total 8 pages.
Extended European Search Report issued in corresponding European Application No. 19948165.6, dated Aug. 24, 2022, pp. 1-10.
Chinese Office Action issued in corresponding Chinese Application No. 201980100849.7, dated Apr. 21, 2023, pp. 1-16.

* cited by examiner

METHOD, APPARATUS, AND SYSTEM FOR DETERMINING PAGING OCCASION OF TERMINAL

CROSS-REFERENCE TO RELATED APPLICATIONS

This application is a continuation of International Application No. PCT/CN2019/109748, filed on Sep. 30, 2019. The disclosures of the aforementioned applications are hereby incorporated by reference in their entireties.

TECHNICAL FIELD

Embodiments of this application relate to the field of communication technologies, and in particular, to a method, an apparatus, and a system for determining a paging occasion (paging occasion, PO) of a terminal.

BACKGROUND

With development of communication technologies, a terminal user may simultaneously hold a plurality of universal subscriber identity modules (universal subscriber identity module, USIM) in a plurality of manners. For example, a plurality of card slots are deployed in a terminal; or a plurality of USIMs are stored in one universal integrated circuit card (universal integrated circuit card, UICC) in a terminal device; or a plurality of USIMs are stored in a terminal device without a UICC, that is, in a manner of soft SIMs or soft USIMs. In these manners, the terminal user can use a plurality of USIMs to contact different user groups or perform different communication services. In addition, future enterprise scenarios have a strong demand for one terminal to support a plurality of USIMs.

In mobile communication, a terminal in an idle mode uses a discontinuous reception (discontinuous reception, DRX) mechanism. A network side broadcasts a DRX paging parameter to the terminal by using system information, and the terminal determines a paging frame (paging frame, PF) and a paging occasion (paging occasion, PO) based on the paging parameter. The terminal monitors, on the paging occasion (PO) in the paging frame (PF), whether a physical downlink control channel (physical downlink control channel, PDCCH) carries a paging radio network temporary identity (paging radio network temporary identity, P-RNTI) of the terminal or a short-temporary mobile subscriber identity (short-temporary mobile subscriber identity, S-TMSI) of the terminal. If the terminal carries the P-RNTI or the S-TMSI, the terminal receives data on a physical downlink shared channel (physical downlink shared channel, PDSCH) based on a parameter that is of the PDSCH and that is indicated on the PDCCH. If the terminal does not obtain the P-RNTI or the S-TMSI through parsing on the PDCCH, the terminal enters a sleep mode based on a DRX cycle. In one DRX cycle, the terminal can receive the PDCCH only at a time position when the PO occurs, and can sleep during other time, to save power.

Currently, terminals in the market have different communication capabilities, and one communication capability is that the terminal can receive, at the same time, only a network signal of a public land mobile network (public land mobile network, PLMN) corresponding to one USIM. For example, a terminal has a dual SIM dual standby and single receive/single transmit (which may be, for example, referred to as DSDS (dual sim dual standby) 1.0 (single Rx/single Tx)) communication capability; or a terminal in which independent receive ends (receive, Rx) are configured for different USIMs but only one Rx is allowed to work at the same time can receive, at the same time, only a network signal of a PLMN corresponding to one USIM; or more than two Rx in a terminal can serve only one USIM at the same time, so that the more than two Rx are also one Rx logically.

According to an existing PO determining method, POs calculated by using a plurality of USIMs in one terminal may be the same, causing a collision. When a communication capability of the terminal is that the terminal can receive, at the same time, only a network signal of a PLMN corresponding to one USIM, because the POs calculated by using the plurality of USIMs are the same, the terminal can receive a paging message of only one of the USIMs, and miss paging messages of other USIMs. Consequently, the communication capability of the terminal is reduced.

SUMMARY

Embodiments of this application provide a method, an apparatus, and a system for determining a paging occasion of a terminal, so that when the terminal includes a plurality of USIM cards, the terminal can receive a paging signal of each USIM, to ensure a communication capability of the terminal.

To achieve the foregoing objective, the following technical solutions are used in embodiments of this application.

According to a first aspect, this application provides a method for determining a PO of a terminal, where the terminal includes a first USIM and a second USIM, and the method may include: When a first PO of the first USIM is the same as a PO of the second USIM, the terminal sends indication information to a mobility management network element communicating with the first USIM, where the indication information is used to indicate that POs of at least two USIMs in the terminal are the same; the terminal receives a first parameter from the mobility management network element; and the terminal determines a second PO of the first USIM based on the first parameter, where the second PO of the first USIM is different from the PO of the second USIM.

According to the method for determining the PO of the terminal provided in this application, when determining that POs of two USIMs in the terminal are the same, the terminal requests, by using the indication information, the mobility management network element to configure the parameter used to determine the second PO of the first USIM, to change the PO of one of the USIMs whose POs are the same, so as to ensure that the POs of the USIMs in the terminal are not the same. Even if the terminal can receive, at the same time, only a network signal of a PLMN corresponding to one USIM, the terminal can also receive a paging signal of each USIM, so that a communication capability of the terminal is ensured.

The first USIM and the second USIM are any two USIMs whose POs are the same in a plurality of USIMs deployed in the terminal. When POs of more than two USIMs in the terminal are the same, every two of the USIMs whose POs are the same may be grouped, and two USIMs in each group are used as the first USIM and the second USIM to perform the solution provided in this application to resolve the PO collision. When the terminal includes the plurality of USIM cards, the terminal can receive a paging signal of each USIM, to ensure the communication capability of the terminal.

The first USIM is either one of the two USIMs whose POs collide in the terminal.

It should be noted that the first PO of the first USIM is a PO that is of the first USIM and that is determined by using a parameter delivered by using a system broadcast message, the second PO of the first USIM is a PO that is of the first USIM and that is obtained through adjustment by using the solution provided in this application, and the PO of the second USIM is a PO that is of the second USIM and that is determined by using a parameter delivered by a system broadcast message.

With reference to the first aspect, in a possible implementation, the indication information may include a second parameter, and the first parameter is determined based on the second parameter. In a communication system, that a PO determining parameter is used as indication information indicating that POs of at least two USIMs in the terminal are the same is specified in a protocol. In this implementation, the terminal uses the second parameter as the indication information.

The second parameter is a parameter that is determined by the terminal when the first PO of the first USIM is the same as the PO of the second USIM and that is used to determine the second PO of the first USIM.

With reference to the first aspect, in another possible implementation, the indication information may be a field or an information element that is specified in a protocol and that is specifically used to indicate that POs of at least two USIMs in the terminal are the same.

With reference to any one of the first aspect or the foregoing possible implementations, in another possible implementation, the method for determining the PO of the terminal provided in this application may further include: The terminal sends an initial parameter to the mobility management network element, where the initial parameter may include a parameter used to determine the first PO of the first USIM and a parameter used to determine the PO of the second USIM. In this implementation, the terminal sends the initial parameter, and the initial parameter is used by the mobility management network element to verify the determined first parameter during determining of the first parameter, to ensure that the second PO that is of the first USIM and that is determined based on the first parameter is different from the PO of the second USIM.

It should be noted that, in a communication system, that a PO determining parameter is used as indication information indicating that POs of at least two USIMs in the terminal are the same is specified in a protocol. In this implementation, the terminal sends the initial parameter as the indication information to the mobility management network element.

With reference to any one of the first aspect or the foregoing possible implementations, in another possible implementation, before the terminal sends the indication information to the mobility management network element communicating with the first USIM, the method for determining the PO of the terminal provided in this application may further include: The terminal determines that both the first USIM and the second USIM are in an idle mode. The solution provided in this application is performed only when the two USIMs are in the idle mode, to improve effectiveness of the solution.

With reference to any one of the first aspect or the foregoing possible implementations, in another possible implementation, the method for determining the PO of the terminal provided in this application may further include: The terminal determines that the first PO of the first USIM is the same as the PO of the second USIM.

In this application, that the terminal determines that the first PO of the first USIM is the same as the PO of the second USIM may be specifically implemented as follows: The terminal determines, based on the initial parameter and an algorithm for calculating the first PO, that the first PO of the first USIM is the same as the PO of the second USIM.

With reference to any one of the first aspect or the foregoing possible implementations, in another possible implementation, the first parameter or the second parameter includes a globally unique temporary user equipment identity (globally unique temporary user equipment identity, GUTI) and/or a DRX parameter. The GUTI and/or the DRX parameter in the first parameter or the second parameter are/is different from a GUTI and/or a DRX parameter in the initial parameter.

With reference to any one of the first aspect or the foregoing possible implementations, in another possible implementation, the indication information may be used to indicate that the first PO of the first USIM is the same as the PO of the second USIM.

According to a second aspect, this application provides another method for determining a paging occasion PO of a terminal. The method may include: A mobility management network element communicating with a first USIM in the terminal receives indication information from the terminal, where the indication information is used to indicate that POs of at least two USIMs in the terminal are the same, and the at least two USIMs include the first USIM; the mobility management network element determines a first parameter after receiving the indication information; the mobility management network element sends the first parameter to the terminal, where the first parameter is used to determine a second PO of the first USIM, and the second PO of the first USIM is different from a PO of a second USIM in the terminal; the mobility management network element determines a paging parameter based on the first parameter, where the paging parameter is used to determine the second PO of the first USIM; and the mobility management network element sends the paging parameter to an access network device.

According to the method for determining the PO of the terminal provided in this application, when determining that POs of two USIMs in the terminal are the same, the terminal requests, by using the indication information, the mobility management network element to configure the parameter used to determine the second PO of the first USIM, to change the PO of one of the USIMs whose POs are the same, so as to ensure that the POs of the USIMs in the terminal are not the same. Even if the terminal can receive, at the same time, only a network signal of a PLMN corresponding to one USIM, the terminal can also receive a paging signal of each USIM, so that a communication capability of the terminal is ensured.

A first PO of the first USIM is the same as the PO of the second USIM.

With reference to the second aspect, in a possible implementation, the indication information may include a second parameter, and the second parameter is a parameter that is determined by the terminal and that is used to determine the second PO of the first USIM; and the first parameter is determined based on the second parameter. In a communication system, that a PO determining parameter is used as indication information indicating that POs of at least two USIMs in the terminal are the same is specified in a protocol. In this implementation, the terminal uses the second parameter as the indication information.

Specifically, when the indication information is the second parameter, that the mobility management network element determines a first parameter after receiving the indication information may be specifically implemented as follows: If determining that the second parameter is different from a parameter of another USIM, the mobility management network element uses the second parameter as the first parameter. Alternatively, if determining that the second parameter is the same as a parameter of another USIM, the mobility management network element determines a new first parameter different from the second parameter.

With reference to the second aspect, in a possible implementation, that the mobility management network element determines a first parameter after receiving the indication information may be specifically implemented as follows: The mobility management network element receives an initial parameter from the terminal, where the initial parameter includes a parameter used to determine the first PO of the first USIM and a parameter used to determine the PO of the second USIM; and the mobility management network element determines the first parameter based on the initial parameter. In this implementation, the initial parameter is used by the mobility management network element to verify the determined first parameter during determining of the first parameter, to ensure that the second PO that is of the first USIM and that is determined based on the first parameter is different from the PO of the second USIM.

It should be noted that, in a communication system, that a PO determining parameter is used as indication information indicating that POs of at least two USIMs in the terminal are the same may be specified in a protocol. In this implementation, the initial parameter may be sent as the indication information to the mobility management network element.

With reference to any one of the second aspect or the foregoing possible implementations, in another possible implementation, the paging parameter may include a serving temporary mobile subscriber identity (serving-temporary mobile subscriber identity, S-TMSI) and/or a DRX parameter.

The S-TMSI is a least significant bit part of a GUTI.

With reference to any one of the second aspect or the foregoing possible implementations, in another possible implementation, the indication information may be used to indicate that the first PO of the first USIM is the same as the PO of the second USIM.

With reference to any one of the second aspect or the foregoing possible implementations, in another possible implementation, the first parameter or the second parameter includes the GUTI and/or the DRX parameter. The GUTI and/or the DRX parameter in the first parameter or the second parameter are/is different from a GUTI and/or a DRX parameter in the initial parameter.

It should be noted that the method for determining the PO of the terminal provided in the second aspect and the method for determining the PO of the terminal provided in the first aspect are described from different perspectives of a same solution, and specific implementations thereof may be mutually referenced.

According to a third aspect, this application provides another method for determining a PO of a terminal, where the terminal includes a first USIM and a second USIM, and the method may include: When a first PO of the first USIM is the same as a PO of the second USIM, the terminal sends a second parameter to a mobility management network element communicating with the first USIM, where the second parameter is used to determine a second PO of the first USIM, and the second PO of the first USIM is different from the PO of the second USIM; and the terminal determines the second PO of the first USIM based on the second parameter.

According to the method for determining the PO of the terminal provided in this application, when determining that POs of two USIMs in the terminal are the same, the terminal reconfigures the parameter used to determine the second PO of the first USIM, and sends the configured parameter to the mobility management network element, to change the PO of one of the USIMs whose POs are the same, so as to ensure that the POs of the USIMs in the terminal are not the same. Even if the terminal can receive, at the same time, only a network signal of a PLMN corresponding to one USIM, the terminal can also receive a paging signal of each USIM, so that a communication capability of the terminal is ensured.

With reference to the third aspect, in a possible implementation, the method for determining the PO of the terminal provided in this application may further include: The terminal sends indication information to the mobility management network element, where the indication information is used to indicate that POs of at least two USIMs in the terminal are the same.

With reference to any one of the third aspect or the foregoing possible implementation, in another possible implementation, before the terminal sends the second parameter to the mobility management network element communicating with the first USIM, the method for determining the PO of the terminal provided in this application may further include: The terminal determines that both the first USIM and the second USIM are in an idle mode. The solution provided in this application is performed only when the two USIMs are in the idle mode, to improve effectiveness of the solution.

With reference to any one of the third aspect or the foregoing possible implementations, in another possible implementation, the method for determining the PO of the terminal provided in this application may further include: The terminal determines that the first PO of the first USIM is the same as the PO of the second USIM.

With reference to any one of the third aspect or the foregoing possible implementations, in another possible implementation, the second parameter includes a GUTI and/or a DRX parameter. The GUTI and/or the DRX parameter in the second parameter are/is different from a GUTI and a DRX parameter in an initial parameter.

According to a fourth aspect, this application provides still another method for determining a paging occasion PO of a terminal. The method may include: A mobility management network element communicating with a first USIM in the terminal receives a second parameter from the terminal; the mobility management network element determines that POs of at least two USIMs in the terminal are the same, where the at least two USIMs include the first USIM; the mobility management network element determines a paging parameter of the first USIM based on the second parameter; and the mobility management network element sends the paging parameter to an access network device, where the paging parameter is used to determine a PO of the first USIM.

According to the method for determining the PO of the terminal provided in this application, when determining that POs of two USIMs in the terminal are the same, the terminal reconfigures the parameter used to determine a second PO of the first USIM, and sends the configured parameter to the mobility management network element, to change the PO of one of the USIMs whose POs are the same, so as to ensure that the POs of the USIMs in the terminal are not the same. Even if the terminal can receive, at the same time, only a network signal of a PLMN corresponding to one USIM, the terminal can also receive a paging signal of each USIM, so that a communication capability of the terminal is ensured.

A first PO of the first USIM is the same as a PO of the second USIM. The second parameter is a parameter that is determined by the terminal when the first PO of the first USIM is the same as the PO of the second USIM and that is used to determine the second PO of the first USIM.

With reference to the fourth aspect, in a possible implementation, that the mobility management network element determines that POs of at least two USIMs in the terminal are the same may be specifically implemented as follows: The mobility management network element receives indication information from the terminal, where the indication information is used to indicate that the POs of the at least two USIMs in the terminal are the same. In this implementation, the indication information may be a field or an information element that is specified in a protocol and that is specifically used to indicate that POs of at least two USIMs in the terminal are the same.

With reference to the fourth aspect, in a possible implementation, that the mobility management network element determines that POs of at least two USIMs in the terminal are the same may be specifically implemented as follows: The mobility management network element receives dedicated signaling from the terminal, where the dedicated signaling is used to indicate that the POs of the at least two USIMs in the terminal are the same. In this implementation, the dedicated signaling may be existing dedicated signaling or newly defined dedicated signaling that is specified in a protocol and that is specifically used to indicate that POs of at least two USIMs in the terminal are the same.

With reference to the fourth aspect, in a possible implementation, in a communication system, that a PO determining parameter is used as indication information indicating that POs of at least two USIMs in the terminal are the same is specified in a protocol. In this implementation, the second parameter is used as the indication information.

With reference to any one of the fourth aspect or the foregoing possible implementations, in another possible implementation, the paging parameter may include a serving temporary mobile subscriber identity (serving-temporary mobile subscriber identity, S-TMSI) and/or a DRX parameter.

The S-TMSI is a least significant bit part of a GUIT.

With reference to any one of the fourth aspect or the foregoing possible implementations, in another possible implementation, the second parameter includes the GUTI and/or the DRX parameter. The GUTI and/or the DRX parameter in the second parameter are/is different from a GUTI and a DRX parameter in an initial parameter.

It should be noted that the method for determining the PO of the terminal provided in the fourth aspect and the method for determining the PO of the terminal provided in the third aspect are described from different perspectives of a same solution, and specific implementations thereof may be mutually referenced.

According to a fifth aspect, this application provides a method for determining a PO of a terminal, where the terminal includes a first USIM and a second USIM, and the method may include: When a first PO of the first USIM is the same as a PO of the second USIM, the terminal sends indication information to a mobility management network element communicating with the first USIM, where the indication information is used to indicate that POs of at least two USIMs in the terminal are the same; and the terminal determines a second PO of the first USIM based on a dedicated algorithm, where the second PO of the first USIM is different from the PO of the second USIM, the first PO of the first USIM is the same as the PO of the second USIM, and the dedicated algorithm is different from an algorithm for determining the first PO of the first USIM.

According to the method for determining the PO of the terminal provided in this application, when determining that POs of two USIMs in the terminal are the same, the terminal determines the second PO of the first USIM based on the dedicated algorithm, and requests, by using the indication information, the mobility management network element to indicate an access network device to determine the second PO of the first USIM based on the dedicated algorithm, to change the PO of one of the USIMs whose POs are the same, so as to ensure that the POs of the USIMs in the terminal are not the same. Even if the terminal can receive, at the same time, only a network signal of a PLMN corresponding to one USIM, the terminal can also receive a paging signal of each USIM, so that a communication capability of the terminal is ensured.

When the second PO of the first USIM is determined by using the dedicated algorithm, an initial parameter may be used.

With reference to the fifth aspect, in a possible implementation, the method for determining the PO of the terminal provided in this application may further include: The terminal determines that the first PO of the first USIM is the same as the PO of the second USIM.

With reference to any one of the fifth aspect or the foregoing possible implementation, in another possible implementation, before the terminal sends the indication information to the mobility management network element communicating with the first USIM, the method for determining the PO of the terminal provided in this application may further include: The terminal determines that both the first USIM and the second USIM are in an idle mode. The solution provided in this application is performed only when the two USIMs are in the idle mode, to improve effectiveness of the solution.

With reference to any one of the fifth aspect or the foregoing possible implementations, in another possible implementation, the indication information may be used to indicate that the first PO of the first USIM is the same as the PO of the second USIM.

According to a sixth aspect, this application provides still another method for determining a PO of a terminal. The method may include: A mobility management network element communicating with a first USIM in the terminal receives indication information from the terminal, where the indication information is used to indicate that POs of at least two USIMs in the terminal are the same, and the at least two USIMs include the first USIM; the mobility management network element determines a paging parameter based on an initial parameter, where the paging parameter is used to determine a second PO of the first USIM; the mobility management network element sends collision indication information and the paging parameter to an access network device, where the collision indication information is used to indicate the access network device to determine, based on a dedicated algorithm, the second PO of the first USIM, and page the first USIM on the second PO of the first USIM; or the collision indication information is used to indicate that a PO of the first USIM collides with a PO of a second USIM, so that the access network device determines, based on a dedicated algorithm, the second PO of the first USIM, and page the first USIM on the second PO of the first USIM; or the collision indication information is used to indicate that a PO that is of the first USIM and that corresponds to an S-TMSI in the paging parameter collides with a PO of a second USIM, so that the access network device determines, based on a dedicated algorithm, the second PO of the first USIM, and page the first USIM on the second PO of the first USIM. The second PO of the first USIM is different from the PO of the second USIM, a first PO of the first USIM is the same as the PO of the second USIM, and the dedicated algorithm is different from an algorithm for determining the first PO of the first USIM.

According to the method for determining the PO of the terminal provided in this application, when determining that POs of two USIMs in the terminal are the same, the terminal requests, by using the indication information, the mobility management network element to indicate the access network device to determine the second PO of the first USIM based on the dedicated algorithm, to change the PO of one of the USIMs whose POs are the same, so as to ensure that the POs of the USIMs in the terminal are not the same. Even if the terminal can receive, at the same time, only a network signal of a PLMN corresponding to one USIM, the terminal can also receive a paging signal of each USIM, so that a communication capability of the terminal is ensured.

With reference to the sixth aspect, in a possible implementation, the paging parameter may include an S-TMSI and/or a DRX parameter. The S-TMSI is a least significant bit part of a GUIT.

With reference to any one of the sixth aspect or the foregoing possible implementation, in another possible implementation, the indication information may be used to indicate that the first PO of the first USIM is the same as the PO of the second USIM.

It should be noted that the method for determining the PO of the terminal provided in the sixth aspect and the method for determining the PO of the terminal provided in the fifth aspect are described from different perspectives of a same solution, and specific implementations thereof may be mutually referenced.

According to a seventh aspect, this application provides still another method for determining a PO of a terminal. The method may include: An access network device receives a paging parameter and collision indication information from a mobility management network element, where the collision indication information is used to indicate the access network device to determine a second PO of a first USIM based on a dedicated algorithm; or the collision indication information is used to indicate that a PO of a first USIM collides with a PO of a second USIM, so that the access network device determines, based on a dedicated algorithm, a second PO of the first USIM, and page the first USIM on the second PO of the first USIM; or the collision indication information is used to indicate that a PO that is of the first USIM and that corresponds to an S-TMSI in the paging parameter collides with a PO of the second USIM, so that the access network device determines, based on a dedicated algorithm, a second PO of the first USIM, and page the first USIM on the second PO of the first USIM. A first PO of the first USIM is the same as the PO of the second USIM, and the dedicated algorithm is different from an algorithm used by the access network device to determine the first PO of the first USIM; the access network device determines the second PO of the first USIM based on the dedicated algorithm and the paging parameter; and the access network device pages the first USIM based on the second PO.

According to the method for determining the PO of the terminal provided in this application, when determining that POs of two USIMs in the terminal are the same, the terminal requests, by using the indication information, the mobility management network element to indicate the access network device to determine the second PO of the first USIM based on the dedicated algorithm, to change the PO of one of the USIMs whose POs are the same, so as to ensure that the POs of the USIMs in the terminal are not the same. Even if the terminal can receive, at the same time, only a network signal of a PLMN corresponding to one USIM, the terminal can also receive a paging signal of each USIM, so that a communication capability of the terminal is ensured.

It should be noted that the method for determining the PO of the terminal provided in the seventh aspect and the method for determining the PO of the terminal provided in the fifth aspect are described from different perspectives of a same solution, and specific implementations thereof may be mutually referenced.

With reference to the seventh aspect, in a possible implementation, the paging parameter may include an S-TMSI and/or a DRX parameter. The S-TMSI is a least significant bit part of a GUIT.

With reference to any one of the seventh aspect or the foregoing possible implementation, in another possible implementation, the indication information may be used to indicate that the first PO of the first USIM is the same as the PO of the second USIM.

According to an eighth aspect, this application provides still another method for determining a PO of a terminal, where the terminal includes a first USIM and a second USIM, and the method may include: When a first PO of the first USIM is the same as a PO of the second USIM, the terminal sends a third parameter to a mobility management network element communicating with the first USIM; the terminal receives a fourth parameter from the mobility management network element, where the fourth parameter is determined based on the third parameter; and the terminal determines a second PO of the first USIM based on the fourth parameter, where the second PO of the first USIM is different from the PO of the second USIM.

According to the method for determining the PO of the terminal provided in this application, when determining that POs of two USIMs in the terminal are the same, the terminal reconfigures the parameter used to determine the second PO of the first USIM, and sends the configured parameter to the mobility management network element, to request the mobility management network element to configure the parameter used to determine the second PO of the first USIM, to change the PO of one of the USIMs whose POs are the same, so as to ensure that the POs of the USIMs in the terminal are not the same. Even if the terminal can receive, at the same time, only a network signal of a PLMN corresponding to one USIM, the terminal can also receive a paging signal of each USIM, so that a communication capability of the terminal is ensured.

With reference to any one of the eighth aspect or the foregoing possible implementation, in another possible implementation, before the terminal sends the third parameter to the mobility management network element communicating with the first USIM, the method for determining the PO of the terminal provided in this application may further include: The terminal determines that both the first USIM and the second USIM are in an idle mode. The solution provided in this application is performed only when the two USIMs are in the idle mode, to improve effectiveness of the solution.

With reference to any one of the eighth aspect or the foregoing possible implementation, in another possible implementation, the method for determining the PO of the terminal provided in this application may further include: The terminal determines that the first PO of the first USIM is the same as the PO of the second USIM.

With reference to any one of the eighth aspect or the foregoing possible implementations, in another possible implementation, the third parameter or the fourth parameter includes a GUTI and/or a DRX parameter. The GUTI and/or the DRX parameter in the third parameter or the fourth parameter are/is different from a GUTI and/or a DRX parameter in an initial parameter.

According to a ninth aspect, this application provides still another method for determining a PO of a terminal. The method may include: A mobility management network element communicating with a first USIM in the terminal receives a third parameter from the terminal; the mobility management network element determines a fourth parameter based on the third parameter; the mobility management network element sends the fourth parameter to the terminal, where the fourth parameter is used to determine a second PO of the first USIM, and the second PO of the first USIM is different from a PO of a second USIM in the terminal; the mobility management network element determines a paging parameter based on the fourth parameter, where the paging parameter is used to determine the second PO of the first USIM; and the mobility management network element sends the determined paging parameter to an access network device.

According to the method for determining the PO of the terminal provided in this application, when determining that POs of two USIMs in the terminal are the same, the terminal reconfigures the parameter used to determine the second PO of the first USIM, and sends the configured parameter to the mobility management network element, and the mobility management network element determines the final parameter used to determine the second PO of the first USIM, to change the PO of one of the USIMs whose POs are the same, so as to ensure that the POs of the USIMs in the terminal are not the same. Even if the terminal can receive, at the same time, only a network signal of a PLMN corresponding to one USIM, the terminal can also receive a paging signal of each USIM, so that a communication capability of the terminal is ensured.

With reference to the ninth aspect, in a possible implementation, that the mobility management network element determines a fourth parameter based on the third parameter may be specifically implemented as follows: The mobility management network element uses the third parameter as the fourth parameter; or the mobility management network element determines the fourth parameter based on an initial parameter; or the mobility management network element determines the fourth parameter based on the third parameter.

Specifically, if determining that the third parameter does not collide with a parameter of another USIM, the mobility management network element uses the third parameter as the fourth parameter. Alternatively, if determining that the third parameter collides with a parameter of another USIM, the mobility management network element determines a new fourth parameter different from the third parameter.

With reference to any one of the ninth aspect or the foregoing possible implementation, in another possible implementation, the paging parameter may include an S-TMSI and/or a DRX parameter. The S-TMSI is a least significant bit part of a GUIT.

With reference to any one of the ninth aspect or the foregoing possible implementations, in another possible implementation, the indication information may be used to indicate that a first PO of the first USIM is the same as the PO of the second USIM.

With reference to any one of the ninth aspect or the foregoing possible implementations, in another possible implementation, the third parameter or the fourth parameter includes the GUTI and/or the DRX parameter. The GUTI and/or the DRX parameter in the third parameter or the fourth parameter are/is different from a GUTI and/or a DRX parameter in the initial parameter.

It should be noted that the method for determining the PO of the terminal provided in the ninth aspect and the method for determining the PO of the terminal provided in the eighth aspect are described from different perspectives of a same solution, and specific implementations thereof may be mutually referenced.

According to a tenth aspect, this application provides still another method for determining a PO of a terminal, where the terminal includes a first USIM and a second USIM, and the method may include: When a first PO of the first USIM is the same as a PO of the second USIM, the terminal sends an initial parameter to a mobility management network element communicating with the first USIM, where the initial parameter includes a parameter used to determine the first PO of the first USIM and a parameter used to determine the PO of the second USIM; the terminal receives a first parameter from the mobility management network element; and the terminal determines a second PO of the first USIM based on the first parameter, where the second PO of the first USIM is different from the PO of the second USIM.

According to the method for determining the PO of the terminal provided in this application, when determining that POs of two USIMs in the terminal are the same, the terminal requests, by sending the initial parameter, the mobility management network element to configure the parameter used to determine the second PO of the first USIM, and verifies the determined first parameter by using the initial parameter, to change the PO of one of the USIMs whose POs are the same, so as to ensure that the POs of the USIMs in the terminal are not the same. Even if the terminal can receive, at the same time, only a network signal of a PLMN corresponding to one USIM, the terminal can also receive a paging signal of each USIM, so that a communication capability of the terminal is ensured.

With reference to any one of the first aspect or the foregoing possible implementations, in another possible implementation, before the terminal sends indication information to the mobility management network element communicating with the first USIM, the method for determining the PO of the terminal provided in this application may further include: The terminal determines that both the first USIM and the second USIM are in an idle mode. The solution provided in this application is performed only when the two USIMs are in the idle mode, to improve effectiveness of the solution.

With reference to any one of the tenth aspect or the foregoing possible implementation, in another possible implementation, the method for determining the PO of the terminal provided in this application may further include: The terminal determines that the first PO of the first USIM is the same as the PO of the second USIM.

With reference to any one of the tenth aspect or the foregoing possible implementations, in another possible implementation, the first parameter includes a GUTI and/or a DRX parameter. The GUTI and/or the DRX parameter in the first parameter are/is different from a GUTI and a DRX parameter in the initial parameter.

According to an eleventh aspect, this application provides still another method for determining a PO of a terminal. The method may include: A mobility management network element communicating with a first USIM in the terminal receives an initial parameter from the terminal, where the initial parameter includes a parameter used to determine a first PO of the first USIM and a parameter used to determine a PO of a second USIM; the mobility management network element determines a first parameter based on the initial parameter; the mobility management network element sends the first parameter to the terminal, where the first parameter is used to determine a second PO of the first USIM, and the second PO of the first USIM is different from the PO of the second USIM in the terminal; the mobility management network element determines a paging parameter based on the first parameter, where the paging parameter is used to determine the second PO of the first USIM; and the mobility management network element sends the paging parameter to an access network device.

According to the method for determining the PO of the terminal provided in this application, when determining that POs of two USIMs in the terminal are the same, the terminal requests, by sending the initial parameter, the mobility management network element to configure the parameter used to determine the second PO of the first USIM, to change the PO of one of the USIMs whose POs are the same, where the initial parameter is used to verify the determined first parameter, so as to ensure that the POs of the USIMs in the terminal are not the same. Even if the terminal can receive, at the same time, only a network signal of a PLMN corresponding to one USIM, the terminal can also receive a paging signal of each USIM, so that a communication capability of the terminal is ensured.

With reference to any one of the eleventh aspect or the foregoing possible implementations, in another possible implementation, the first parameter includes a GUTI and/or a DRX parameter. The GUTI and/or the DRX parameter in the first parameter are/is different from a GUTI and a DRX parameter in the initial parameter.

With reference to any one of the eleventh aspect or the foregoing possible implementation, in another possible implementation, the paging parameter may include an S-TMSI and/or a DRX parameter.

It should be noted that the method for determining the PO of the terminal provided in the eleventh aspect and the method for determining the PO of the terminal provided in the tenth aspect are described from different perspectives of a same solution, and specific implementations thereof may be mutually referenced.

According to a twelfth aspect, this application provides an apparatus for determining a PO of a terminal. The terminal includes a first USIM and a second USIM. The apparatus may be the terminal, an apparatus or a chip system in the terminal, or an apparatus that can be used together with the terminal. The apparatus for determining the PO of the terminal may implement functions performed by the terminal in the foregoing aspects or the possible implementations, and the functions may be implemented by hardware, or may be implemented by hardware executing corresponding software. The hardware or the software includes one or more modules corresponding to the functions. For example, the apparatus for determining the PO of the terminal may include a sending unit, a receiving unit, and a first determining unit.

The sending unit is configured to: when a first PO of the first USIM is the same as a PO of the second USIM, send indication information to a mobility management network element communicating with the first USIM, where the indication information is used to indicate that POs of at least two USIMs in the terminal are the same.

The receiving unit is configured to receive a first parameter from the mobility management network element.

The first determining unit is configured to determine a second PO of the first USIM based on the first parameter, where the second PO of the first USIM is different from the PO of the second USIM.

It should be noted that the apparatus for determining the PO of the terminal provided in the twelfth aspect is configured to perform the method for determining the PO of the terminal provided in the first aspect. For a specific implementation, refer to the specific implementation of the first aspect.

According to a thirteenth aspect, this application provides another apparatus for determining a PO of a terminal. The apparatus may be a mobility management network element communicating with a first USIM in the terminal, an apparatus or a chip system in the mobility management network element, or an apparatus that can be used together with the mobility management network element. The apparatus for determining the PO of the terminal may implement functions performed by the mobility management network element in the foregoing aspects or the possible implementations, and the functions may be implemented by hardware, or may be implemented by hardware executing corresponding software. The hardware or the software includes one or more modules corresponding to the functions. For example, the apparatus for determining the PO of the terminal may include a receiving unit, a determining unit, and a sending unit.

The receiving unit is configured to receive indication information from the terminal, where the indication information is used to indicate that POs of at least two USIMs in the terminal are the same, and the at least two USIMs include the first USIM.

The determining unit is configured to determine a first parameter after the receiving unit receives the indication information.

The sending unit is configured to send the first parameter to the terminal, where the first parameter is used to determine a second PO of the first USIM, and the second PO of the first USIM is different from a PO of a second USIM in the terminal.

The determining unit is further configured to determine a paging parameter based on the first parameter, where the paging parameter is used to determine the second PO of the first USIM.

The sending unit is further configured to send, to an access network device, the paging parameter determined by the determining unit.

It should be noted that the apparatus for determining the PO of the terminal provided in the thirteenth aspect is configured to perform the method for determining the PO of the terminal provided in the second aspect. For a specific implementation, refer to the specific implementation of the second aspect.

According to a fourteenth aspect, this application provides an apparatus for determining a PO of a terminal. The terminal includes a first USIM and a second USIM. The apparatus may be the terminal, an apparatus or a chip system in the terminal, or an apparatus that can be used together with the terminal. The apparatus for determining the PO of the terminal may implement functions performed by the terminal in the foregoing aspects or the possible implementations, and the functions may be implemented by hardware, or may be implemented by hardware executing corresponding software. The hardware or the software includes one or more modules corresponding to the functions. For example, the apparatus for determining the PO of the terminal may include a sending unit and a first determining unit.

The sending unit is configured to: when a first PO of the first USIM is the same as a PO of the second USIM, send a second parameter to a mobility management network element communicating with the first USIM, where the second parameter is used to determine a second PO of the first USIM, and the second PO of the first USIM is different from the PO of the second USIM.

The first determining unit is configured to determine the second PO of the first USIM based on the second parameter.

It should be noted that the apparatus for determining the PO of the terminal provided in the fourteenth aspect is configured to perform the method for determining the PO of the terminal provided in the third aspect. For a specific implementation, refer to the specific implementation of the third aspect.

According to a fifteenth aspect, this application provides another apparatus for determining a PO of a terminal. The apparatus may be a mobility management network element communicating with a first USIM in the terminal, an apparatus or a chip system in the mobility management network element, or an apparatus that can be used together with the mobility management network element. The apparatus for determining the PO of the terminal may implement functions performed by the mobility management network element in the foregoing aspects or the possible implementations, and the functions may be implemented by hardware, or may be implemented by hardware executing corresponding software. The hardware or the software includes one or more modules corresponding to the functions. For example, the apparatus for determining the PO of the terminal may include a receiving unit, a determining unit, and a sending unit.

The receiving unit is configured to receive a second parameter from the terminal.

The determining unit is configured to determine that POs of at least two USIMs in the terminal are the same, where the at least two USIMs include the first USIM.

The determining unit is further configured to determine a paging parameter of the first USIM based on the second parameter.

The sending unit is configured to send, to an access network device, the paging parameter determined by the determining unit, where the paging parameter is used to determine a PO of the first USIM.

It should be noted that the apparatus for determining the PO of the terminal provided in the fifteenth aspect is configured to perform the method for determining the PO of the terminal provided in the fourth aspect. For a specific implementation, refer to the specific implementation of the fourth aspect.

According to a sixteenth aspect, this application provides an apparatus for determining a PO of a terminal. The terminal includes a first USIM and a second USIM. The apparatus may be the terminal, an apparatus or a chip system in the terminal, or an apparatus that can be used together with the terminal. The apparatus for determining the PO of the terminal may implement functions performed by the terminal in the foregoing aspects or the possible implementations, and the functions may be implemented by hardware, or may be implemented by hardware executing corresponding software. The hardware or the software includes one or more modules corresponding to the functions. For example, the apparatus for determining the PO of the terminal may include a sending unit and a first determining unit.

The sending unit is configured to: when a first PO of the first USIM is the same as a PO of the second USIM, send indication information to a mobility management network element communicating with the first USIM, where the indication information is used to indicate that POs of at least two USIMs in the terminal are the same.

The first determining unit is configured to determine a second PO of the first USIM based on a dedicated algorithm, where the second PO of the first USIM is different from the PO of the second USIM, the first PO of the first USIM is the same as the PO of the second USIM, and the dedicated algorithm is different from an algorithm for determining the first PO of the first USIM.

It should be noted that the apparatus for determining the PO of the terminal provided in the sixteenth aspect is configured to perform the method for determining the PO of the terminal provided in the fifth aspect. For a specific implementation, refer to the specific implementation of the fifth aspect.

According to a seventeenth aspect, this application provides another apparatus for determining a PO of a terminal. The apparatus may be a mobility management network element communicating with a first USIM in the terminal, an apparatus or a chip system in the mobility management network element, or an apparatus that can be used together with the mobility management network element. The apparatus for determining the PO of the terminal may implement functions performed by the mobility management network element in the foregoing aspects or the possible implementations, and the functions may be implemented by hardware, or may be implemented by hardware executing corresponding software. The hardware or the software includes one or more modules corresponding to the functions. For example, the apparatus for determining the PO of the terminal may include a receiving unit, a determining unit, and a sending unit.

The receiving unit is configured to receive indication information from the terminal, where the indication information is used to indicate that POs of at least two USIMs in the terminal are the same, and the at least two USIMs include the first USIM.

The determining unit is configured to determine a paging parameter based on an initial parameter, where the paging parameter is used to determine a second PO of the first USIM.

The determining unit is further configured to determine a paging parameter of the first USIM based on a second parameter.

The sending unit is configured to send collision indication information and the paging parameter to an access network device, where the collision indication information is used to indicate the access network device to determine, based on a dedicated algorithm, the second PO of the first USIM, and page the first USIM on the second PO of the first USIM; or the collision indication information is used to indicate that a PO of the first USIM collides with a PO of a second USIM, so that the access network device determines, based on a dedicated algorithm, the second PO of the first USIM, and page the first USIM on the second PO of the first USIM; or the collision indication information is used to indicate that a PO that is of the first USIM and that corresponds to an S-TMSI in the paging parameter collides with a PO of a second USIM, so that the access network device determines, based on a dedicated algorithm, the second PO of the first USIM, and page the first USIM on the second PO of the first USIM. The second PO of the first USIM is different from the PO of the second USIM, a first PO of the first USIM is the same as the PO of the second USIM, and the dedicated algorithm is different from an algorithm for determining the first PO of the first USIM.

It should be noted that the apparatus for determining the PO of the terminal provided in the seventeenth aspect is configured to perform the method for determining the PO of the terminal provided in the sixth aspect. For a specific implementation, refer to the specific implementation of the sixth aspect.

According to an eighteenth aspect, this application provides another apparatus for determining a PO of a terminal. The apparatus may be an access network device, an apparatus or a chip system in the access network device, or an apparatus that can be used together with the access network device. The apparatus for determining the PO of the terminal may implement functions performed by the access network device in the foregoing aspects or the possible implementations, and the functions may be implemented by hardware, or may be implemented by hardware executing corresponding software. The hardware or the software includes one or more modules corresponding to the functions. For example, the apparatus for determining the PO of the terminal may include a receiving unit, a determining unit, and a paging unit.

The receiving unit is configured to receive a paging parameter and collision indication information from a mobility management network element, where the collision indication information is used to indicate the access network device to determine a second PO of a first USIM based on a dedicated algorithm; or the collision indication information is used to indicate that a PO of a first USIM collides with a PO of a second USIM, so that the access network device determines, based on a dedicated algorithm, a second PO of the first USIM, and page the first USIM on the second PO of the first USIM; or the collision indication information is used to indicate that a PO that is of the first USIM and that corresponds to an S-TMSI in the paging parameter collides with a PO of the second USIM, so that the access network device determines, based on a dedicated algorithm, a second PO of the first USIM, and page the first USIM on the second PO of the first USIM. A first PO of the first USIM is the same as the PO of the second USIM, and the dedicated algorithm is different from an algorithm used by the access network device to determine the first PO of the first USIM.

The determining unit is configured to determine the second PO of the first USIM based on the dedicated algorithm and the paging parameter.

The paging unit is configured to page the first USIM based on the second PO determined by the determining unit.

It should be noted that the apparatus for determining the PO of the terminal provided in the eighteenth aspect is configured to perform the method for determining the PO of the terminal provided in the seventh aspect. For a specific implementation, refer to the specific implementation of the seventh aspect.

According to a nineteenth aspect, this application provides an apparatus for determining a PO of a terminal. The terminal includes a first USIM and a second USIM. The apparatus may be the terminal, an apparatus or a chip system in the terminal, or an apparatus that can be used together with the terminal. The apparatus for determining the PO of the terminal may implement functions performed by the terminal in the foregoing aspects or the possible implementations, and the functions may be implemented by hardware, or may be implemented by hardware executing corresponding software. The hardware or the software includes one or more modules corresponding to the functions. For example, the apparatus for determining the PO of the terminal may include a sending unit, a receiving unit, and a first determining unit.

The sending unit is configured to: when a first PO of the first USIM is the same as a PO of the second USIM, send a third parameter to a mobility management network element communicating with the first USIM.

The receiving unit is configured to receive a fourth parameter from the mobility management network element, where the fourth parameter is determined based on the third parameter.

The first determining unit is configured to determine a second PO of the first USIM based on the fourth parameter, where the second PO of the first USIM is different from the PO of the second USIM.

It should be noted that the apparatus for determining the PO of the terminal provided in the nineteenth aspect is configured to perform the method for determining the PO of the terminal provided in the eighth aspect. For a specific implementation, refer to the specific implementation of the eighth aspect.

According to a twentieth aspect, this application provides another apparatus for determining a PO of a terminal. The apparatus may be a mobility management network element communicating with a first USIM in the terminal, an apparatus or a chip system in the mobility management network element, or an apparatus that can be used together with the mobility management network element. The apparatus for determining the PO of the terminal may implement functions performed by the mobility management network element in the foregoing aspects or the possible implementations, and the functions may be implemented by hardware, or may be implemented by hardware executing corresponding software. The hardware or the software includes one or more modules corresponding to the functions. For example, the apparatus for determining the PO of the terminal may include a receiving unit, a determining unit, and a sending unit.

The receiving unit is configured to receive a third parameter from the terminal.

The determining unit is configured to determine a fourth parameter based on the third parameter.

The sending unit is configured to send the fourth parameter to the terminal, where the fourth parameter is used to determine a second PO of the first USIM, and the second PO of the first USIM is different from a PO of a second USIM in the terminal.

The determining unit is further configured to determine a paging parameter based on the fourth parameter, where the paging parameter is used to determine the second PO of the first USIM.

The sending unit is further configured to send the determined paging parameter to an access network device.

It should be noted that the apparatus for determining the PO of the terminal provided in the twentieth aspect is configured to perform the method for determining the PO of the terminal provided in the ninth aspect. For a specific implementation, refer to the specific implementation of the ninth aspect.

According to a twenty-first aspect, this application provides an apparatus for determining a PO of a terminal. The terminal includes a first USIM and a second USIM. The apparatus may be the terminal, an apparatus or a chip system in the terminal, or an apparatus that can be used together with the terminal. The apparatus for determining the PO of the terminal may implement functions performed by the terminal in the foregoing aspects or the possible implementations, and the functions may be implemented by hardware, or may be implemented by hardware executing corresponding software. The hardware or the software includes one or more modules corresponding to the functions. For example, the apparatus for determining the PO of the terminal may include a sending unit, a receiving unit, and a first determining unit.

The sending unit is configured to: when a first PO of the first USIM is the same as a PO of the second USIM, send an initial parameter to a mobility management network element communicating with the first USIM, where the initial parameter includes a parameter used to determine the first PO of the first USIM and a parameter used to determine the PO of the second USIM.

The receiving unit is configured to receive a first parameter from the mobility management network element.

The determining unit is configured to determine a second PO of the first USIM based on the first parameter, where the second PO of the first USIM is different from the PO of the second USIM.

It should be noted that the apparatus for determining the PO of the terminal provided in the twenty-first aspect is configured to perform the method for determining the PO of the terminal provided in the tenth aspect. For a specific implementation, refer to the specific implementation of the tenth aspect.

According to a twenty-second aspect, this application provides another apparatus for determining a PO of a terminal. The apparatus may be a mobility management network element communicating with a first USIM in the terminal, an apparatus or a chip system in the mobility management network element, or an apparatus that can be used together with the mobility management network element. The apparatus for determining the PO of the terminal may implement functions performed by the mobility management network element in the foregoing aspects or the possible implementations, and the functions may be implemented by hardware, or may be implemented by hardware executing corresponding software. The hardware or the software includes one or more modules corresponding to the functions. For example, the apparatus for determining the PO of the terminal may include a receiving unit, a determining unit, and a sending unit.

The receiving unit is further configured to receive an initial parameter from the terminal, where the initial parameter includes a parameter used to determine a first PO of the first USIM and a parameter used to determine a PO of a second USIM.

The determining unit is further configured to determine a first parameter based on the initial parameter.

The sending unit is further configured to send the first parameter to the terminal, where the first parameter is used to determine a second PO of the first USIM, and the second PO of the first USIM is different from the PO of the second USIM in the terminal.

The determining unit is further configured to determine a paging parameter based on the first parameter, where the paging parameter is used to determine the second PO of the first USIM.

The sending unit is further configured to send the paging parameter to an access network device.

It should be noted that the apparatus for determining the PO of the terminal provided in the twenty-second aspect is configured to perform the method for determining the PO of the terminal provided in the eleventh aspect. For a specific implementation, refer to the specific implementation of the eleventh aspect.

According to a twenty-third aspect, an embodiment of this application provides a terminal. The terminal includes a first USIM and a second USIM, and the terminal includes a processor, configured to implement the method for determining the PO of the terminal according to the first aspect, the third aspect, the fifth aspect, the eighth aspect, or the tenth aspect. The terminal may further include a memory. The memory is coupled to the processor. When executing instructions stored in the memory, the processor may implement the method for determining the PO of the terminal according to the first aspect, the third aspect, the fifth aspect, the eighth aspect, or the tenth aspect. The terminal may further include a communication interface. The communication interface is used by the terminal to communicate with another device. For example, the communication interface may be a transceiver, a circuit, a bus, a module, or a communication interface of another type.

According to a twenty-fourth aspect, an embodiment of this application provides a mobility management network element. The mobility management network element includes a processor, configured to implement the method for determining the PO of the terminal according to the second aspect, the fourth aspect, the sixth aspect, the ninth aspect, or the eleventh aspect. The mobility management network element may further include a memory. The memory is coupled to the processor. When executing instructions stored in the memory, the processor may implement the method for determining the PO of the terminal according to the second aspect, the fourth aspect, the sixth aspect, the ninth aspect, or the eleventh aspect. The mobility management network element may further include a communication interface. The communication interface is used by the mobility management network element to communicate with another device. For example, the communication interface may be a transceiver, a circuit, a bus, a module, or a communication interface of another type.

According to a twenty-fifth aspect, an embodiment of this application provides an access network device. The access network device includes a processor, configured to implement the method for determining the PO of the terminal according to the seventh aspect. The access network device may further include a memory. The memory is coupled to the processor. When executing instructions stored in the memory, the processor may implement the method for determining the PO of the terminal according to the seventh aspect. The access network device may further include a communication interface. The communication interface is used by the access network device to communicate with another device. For example, the communication interface may be a transceiver, a circuit, a bus, a module, or a communication interface of another type.

It should be noted that the instructions in the memory in this application may be pre-stored, or may be downloaded from the Internet and then stored when the apparatus is used. Sources of the instructions in the memory are not specifically limited in this application. The coupling in embodiments of this application is indirect coupling or a connection between apparatuses, units, or modules, may be in an electrical form, a mechanical form, or another form, and is used for information exchange between the apparatuses, the units, or the modules.

According to a twenty-sixth aspect, an embodiment of this application further provides a computer-readable storage medium, including instructions. When the instructions are run on a computer, the computer is enabled to perform the method for determining the PO of the terminal according to any one of the foregoing aspects or the possible implementations.

According to a twenty-seventh aspect, an embodiment of this application further provides a computer program product. When the computer program product runs on a computer, the computer is enabled to perform the method for determining the PO of the terminal according to any one of the foregoing aspects or the possible implementations.

According to a twenty-eighth aspect, an embodiment of this application provides a chip system. The chip system includes a processor, and may further include a memory, to implement a function of the terminal, the mobility management network device, or the access network device in the foregoing method. The chip system may include a chip, or may include the chip and another discrete component.

According to a twenty-ninth aspect, a system for determining a PO of a terminal is provided. The system for determining the PO of the terminal includes a first communication apparatus and a second communication apparatus. The first communication apparatus may implement the method according to any one of the first aspect or the possible implementations of the first aspect. The second communication apparatus may implement the method according to any one of the second aspect or the possible implementations of the second aspect. For example, the first communication apparatus is a terminal, the terminal includes a first USIM and a second USIM, and the second communication apparatus is a mobility management network element communicating with the first USIM in the terminal.

According to a thirtieth aspect, a system for determining a PO of a terminal is provided. The system for determining the PO of the terminal includes a third communication apparatus and a fourth communication apparatus. The third communication apparatus may implement the method according to any one of the third aspect or the possible implementations of the third aspect. The fourth communication apparatus may implement the method according to any one of the fourth aspect or the possible implementations of the fourth aspect. For example, the third communication apparatus is a terminal, the terminal includes a first USIM and a second USIM, and the fourth communication apparatus is a mobility management network element communicating with the first USIM in the terminal.

According to a thirty-first aspect, a system for determining a PO of a terminal is provided. The system for determining the PO of the terminal includes a fifth communication apparatus, a sixth communication apparatus, and a seventh communication apparatus. The fifth communication apparatus may implement the method according to any one of the fifth aspect or the possible implementations of the fifth aspect. The sixth communication apparatus may implement the method according to any one of the sixth aspect or the possible implementations of the sixth aspect. The seventh communication apparatus may implement the method according to any one of the seventh aspect or the possible implementations of the seventh aspect. For example, the fifth communication apparatus is a terminal, the terminal includes a first USIM and a second USIM, the sixth communication apparatus is a mobility management network element communicating with the first USIM in the terminal, and the seventh communication apparatus is an access network device.

According to a thirty-second aspect, a system for determining a PO of a terminal is provided. The system for determining the PO of the terminal includes an eighth communication apparatus and a ninth communication apparatus. The eighth communication apparatus may implement the method according to any one of the eighth aspect or the possible implementations of the eighth aspect. The ninth communication apparatus may implement the method according to any one of the ninth aspect or the possible implementations of the ninth aspect. For example, the eighth communication apparatus is a terminal, the terminal includes a first USIM and a second USIM, and the ninth communication apparatus is a mobility management network element communicating with the first USIM in the terminal.

According to a thirty-fourth aspect, a system for determining a PO of a terminal is provided. The system for determining the PO of the terminal includes a tenth communication apparatus and an eleventh communication apparatus. The tenth communication apparatus may implement the method according to any one of the tenth aspect or the possible implementations of the tenth aspect. The eleventh communication apparatus may implement the method according to any one of the eleventh aspect or the possible implementations of the eleventh aspect. For example, the tenth communication apparatus is a terminal, the terminal includes a first USIM and a second USIM, and the eleventh communication apparatus is a mobility management network element communicating with the first USIM in the terminal.

According to a thirty-fifth aspect, this application provides a system for determining a PO of a terminal. The system for determining the paging occasion PO of the terminal includes a terminal and a mobility management network element communicating with a first USIM, and the terminal includes the first USIM and a second USIM.

The terminal is configured to: when a first PO of the first USIM is the same as a PO of the second USIM, send indication information to the mobility management network element, where the indication information is used to indicate that POs of at least two USIMs in the terminal are the same, and the at least two USIMs include the first USIM.

The mobility management network element is configured to: receive the indication information from the terminal; determine a first parameter after receiving the indication information; and sending the first parameter to the terminal, wherein the first parameter is used to determine a second PO of the first USIM, and the second PO of the first USIM is different from the PO of the second USIM in the terminal;

The terminal is further configured to: receive the first parameter from the mobility management network element; and determine the second PO of the first USIM based on the first parameter.

The mobility management network element is further configured to: determine a paging parameter based on the first parameter, where the paging parameter is used to determine the second PO of the first USIM; and send the paging parameter to an access network device.

According to a thirty-sixth aspect, this application provides a system for determining a PO of a terminal. The system for determining the paging occasion PO of the terminal includes a terminal and a mobility management network element communicating with a first USIM, and the terminal includes the first USIM and a second USIM.

The terminal is configured to: when a first PO of the first USIM is the same as a PO of the second USIM, send a second parameter to a mobility management network element, where the second parameter is used to determine a second PO of the first USIM, and the second PO of the first USIM is different from the PO of the second USIM; and determine the second PO of the first USIM based on the second parameter.

The mobility management network element is configured to: receive the second parameter from the terminal; determine that POs of at least two USIMs in the terminal are the same, where the at least two USIMs include the first USIM; determine a paging parameter of the first USIM based on the second parameter; and send the paging parameter to an access network device, where the paging parameter is used to determine the second PO of the first USIM.

According to a thirty-seventh aspect, this application provides a system for determining a PO of a terminal. The system for determining the paging occasion PO of the terminal includes the terminal, a mobility management network element communicating with a first USIM in the terminal, and an access network device, and the terminal includes the first USIM and a second USIM.

The terminal is configured to: when a first PO of the first USIM is the same as a PO of the second USIM, send indication information to a mobility management network element communicating with the first USIM, where the indication information is used to indicate that POs of at least two USIMs in the terminal are the same, and the at least two USIMs include the first USIM; and determine a second PO of the first USIM based on a dedicated algorithm, where the second PO of the first USIM is different from the PO of the second USIM, the first PO of the first USIM is the same as the PO of the second USIM, and the dedicated algorithm is different from an algorithm for determining the first PO of the first USIM.

The mobility management network element is configured to receive the indication information from the terminal; determine a paging parameter based on an initial parameter, where the paging parameter is used to determine the second PO of the first USIM; and send collision indication information and the paging parameter to an access network device, where the collision indication information is used to indicate the access network device to determine, based on a dedicated algorithm, the second PO of the first USIM, and page the first USIM on the second PO of the first USIM; the collision indication information is used to indicate that a PO of the first USIM collides with a PO of the second USIM, so that the access network device determines, based on a dedicated algorithm, the second PO of the first USIM, and page the first USIM on the second PO of the first USIM; or the collision indication information is used to indicate that a PO that is of the first USIM and that corresponds to an S-TMSI in the paging parameter collides with a PO of the second USIM, so that the access network device determines, based on a dedicated algorithm, the second PO of the first USIM, and page the first USIM on the second PO of the first USIM.

The access network device is configured to: receive the paging parameter and the collision indication information from the mobility management network element; determine the second PO of the first USIM based on the dedicated algorithm and the paging parameter; and page the first USIM based on the second PO.

According to a thirty-eighth aspect, this application provides a system for determining a PO of a terminal. The system for determining the paging occasion PO of the terminal includes a terminal and a mobility management network element communicating with a first USIM, and the terminal includes the first USIM and a second USIM.

The terminal is configured to: when a first PO of the first USIM is the same as a PO of the second USIM, send a third parameter to the mobility management network element communicating with the first USIM.

The mobility management network element is configured to: receive a third parameter from the terminal; determine a fourth parameter based on the third parameter; send the fourth parameter to the terminal, where the fourth parameter is used to determine a second PO of the first USIM, and the second PO of the first USIM is different from the PO of the second USIM in the terminal; determine a paging parameter based on the fourth parameter, where the paging parameter is used to determine the second PO of the first USIM; and send the determined paging parameter to an access network device.

The terminal is further configured to: receive the fourth parameter from the mobility management network element, where the fourth parameter is determined based on the third parameter; and determine the second PO of the first USIM based on the fourth parameter.

According to a thirty-ninth aspect, this application provides a system for determining a PO of a terminal. The system for determining the paging occasion PO of the terminal includes a terminal and a mobility management network element communicating with a first USIM, and the terminal includes the first USIM and a second USIM.

The terminal is configured to: when a first PO of the first USIM is the same as a PO of the second USIM, send an initial parameter to the mobility management network element communicating with the first USIM, where the initial parameter includes a parameter used to determine the first PO of the first USIM and a parameter used to determine the PO of the second USIM.

The mobility management network element is configured to: receive the initial parameter from the terminal; determine a first parameter based on the initial parameter; send the first parameter to the terminal, where the first parameter is used to determine a second PO of the first USIM, and the second PO of the first USIM is different from the PO of the second USIM in the terminal; determine a paging parameter based on the first parameter, where the paging parameter is used to determine the second PO of the first USIM; and send the determined paging parameter to an access network device.

The terminal is further configured to: receive the first parameter from the mobility management network element; and determine the second PO of the first USIM based on the first parameter.

DESCRIPTION OF EMBODIMENTS

Figure 1:
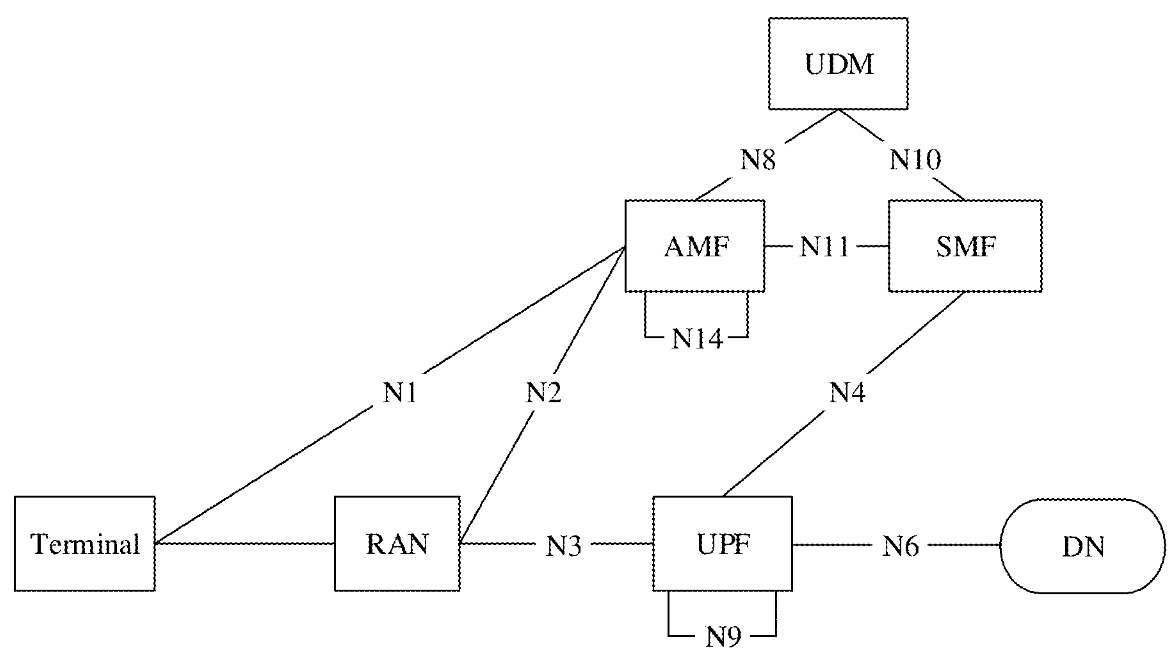
FIG. 1 is a schematic diagram of an architecture of a communication system according to an embodiment of this application.

In embodiments of this application, to clearly describe the technical solutions in embodiments of this application, words such as "first" and "second" are used to distinguish between same items or similar items whose functions are basically the same. A person skilled in the art may understand that the terms such as "first" and "second" do not limit a quantity and an execution sequence, and the terms such as "first" and "second" do not indicate a definite difference. There is no chronological order or no size order between the technical features described by the "first" and the "second".

In addition, in embodiments of this application, the word "example" or "for example" is used to represent giving an example, an illustration, or a description. Any embodiment or implementation scheme described as an "example" or with "for example" in embodiments of this application should not be explained as being more preferred or having more advantages than another embodiment or implementation scheme. Exactly, use of the word "example", "for example", or the like is intended to present a relative concept in a specific manner for ease of understanding.

In the descriptions of this application, "/" represents an "or" relationship between associated objects unless otherwise specified. For example, A/B may represent A or B. The term "and/or" in this application represents only an association relationship for describing associated objects and represents that three relationships may exist. For example, A and/or B may represent the following three cases: Only A exists, both A and B exist, and only B exists, where A and B may be singular or plural. In addition, in the descriptions of this application, "a plurality of" means two or more, unless otherwise specified. "At least one of the following items (pieces)" or a similar expression thereof refers to any combination of these items, including any combination of singular items (pieces) or plural items (pieces). For example, at least one of a, b, or c may indicate: a, b, c, a and b, a and c, b and c, or a, b, and c, where a, b, and c may be singular or plural.

In embodiments of this application, "at least one" may also be "one or more", and "a plurality of" may be two, three, four, or more. This is not limited in this application.

It should be noted that in this application, A sends content to B. When A and B are not directly connected in a network architecture, the content may be forwarded level by level through a network element between A and B, so that the content reaches B. In this specification, it indicates that "A sends the content to B".

In addition, a network architecture and a scenario described in embodiments of this application are intended to describe the technical solutions in embodiments of this application more clearly, and do not constitute a limitation on the technical solutions provided in embodiments of this application. A person of ordinary skill in the art may learn that with evolution of the network architecture and the emergence of new service scenarios, the technical solutions provided in embodiments of this application are also applicable to similar technical problems.

Before embodiments of this application are described, nouns in this application are explained and described herein. Details are not described one by one in the following.

Paging is a manner in which a network side wakes up a terminal in an idle mode by sending a paging signal during mobile communication. Generally, the network side may wake up the terminal in the idle mode in the paging manner when the terminal serves as a called party or there is downlink data to be sent to the terminal.

In a DRX (discontinuous reception, discontinuous reception) mechanism, a terminal stops monitoring a channel within a period of time based on a configured DRX parameter to reduce power consumption.

A DRX parameter is used to indicate a cycle for executing the DRX mechanism. The DRX parameter may include a cell default DRX parameter (default DRX) and a terminal-specific DRX parameter (UE specific DRX). The default DRX parameter is delivered by a network side to all terminals in a cell by using a system information block (system information block, SIB) message in a broadcast manner. The terminal-specific DRX parameter is a terminal-specific DRX parameter negotiated by a terminal and a core network element (for example, an access and mobility management function (access and mobility management function, AMF) in 5G, or a mobile management entity (mobile management entity, MME) in 4G). For example, the terminal sends at least one terminal-specific DRX parameter to the mobility management network element by using a non-access stratum (non-access stratum, NAS) message, and the mobility management network element determines a to-be-used terminal-specific DRX parameter and returns the to-be-used terminal-specific DRX parameter to the terminal. When the mobility management network element pages the terminal, a paging message sent to an access network device carries the terminal-specific DRX parameter.

A paging frame (PF) is a position of a radio frame used by a network side to send a paging message to a terminal. In different communication systems, a manner of calculating a paging frame (PF) is configured, so that a terminal may obtain a value of a paging frame (PF) through calculation based on a parameter broadcast by a network side, and an access network device may obtain the value of the paging frame (PF) through calculation based on a parameter provided by a core network device.

A paging occasion (PO) is a specific position, in a PF, of a paging message sent by a network side to a terminal. In different communication systems, a manner of calculating a paging occasion (PO) is configured, so that a terminal may obtain a value of a paging occasion (PO) through calculation based on a parameter broadcast by a network side, and an access network device may obtain a value of a paging occasion (PO) through calculation based on a parameter provided by a core network device.

A method provided in embodiments of this application may be used in any communication system for supporting one-to-many communication. The communication system may be a 3rd generation partnership project (3rd generation partnership project, 3GPP) communication system, for example, a long term evolution (long term evolution, LTE) system, a 5G mobile communication system, or a new radio (new radio, NR) system; or the communication system may be a non-3GPP communication system. This is not limited.

FIG. 1 is a diagram of an architecture of a communication system. The communication system may include a terminal, a (radio) access network ((radio) access network, (R)AN) device, a core network, a data network (data network, DN), and the like. The access network device is configured to implement a radio access-related function. The terminal accesses the core network through the access network device, accesses the DN, and completes service data exchange.

In FIG. 1, an example in which the core network and an access network are fifth generation (5th generation, 5G) mobile communication networks is used for description. Refer to FIG. 1. Core network devices may include an access and mobility management function (access and mobility management function, AMF) network element, a session management function (session management function, SMF) network element, a user plane function (user plane function, UPF) network element, and a unified data management (unified data management, UDM). The following describes apparatuses in this application with reference to FIG. 1.

The terminal (terminal) may be referred to as user equipment (user equipment, UE) or a terminal device (terminal device). It is clear that the terminal shown in FIG. 1 may include but is not limited to a vehicle-mounted terminal, a mobile phone (mobile phone), a tablet computer or a computer having a wireless transceiver function, a smart gas station, an intelligent traffic light, and the like.

The access network device is a device that provides radio access for the terminal. The access network device is a network including a plurality of 5G-RAN nodes, and implements a radio physical layer function, a resource scheduling function, a radio resource management function, a radio access control function, and a mobility management function. The 5G-RAN is connected to the UPF through a user plane interface N3, and is configured to transmit data of the terminal device. The 5G-RAN establishes a control plane signaling connection to the AMF through a control plane interface N2, and is configured to implement a function such as radio access bearer control. For example, the access network device may be a base station, a broadband network gateway (broadband network gateway, BNG), an aggregation switch, or a non-3GPP access device. The base station may include base stations in various forms, for example, a macro base station, a micro base station (also referred to as a small cell), a relay station, or an access point. This is not specifically limited in embodiments of this application. A device through which the terminal accesses the core network is referred to as the access network device in this specification. Details are not described herein. For example, the access network device may be an evolved universal terrestrial radio access network (evolved universal terrestrial radio access network, E-UTRAN) device in a 4th generation (4th generation, 4G) network; or a next generation radio access network (next generation radio access network, NG-RAN) device, an evolved NodeB (evolved Node B, eNodeB), a Wi-Fi access point (access point, AP), or a world interoperability for microwave access (world interoperability for microwave access, WiMAX) base station (base station, BS) in a 5G network.

The AMF is mainly responsible for mobility management in a mobile network, and main functions of the AMF include functions such as terminal authentication, terminal mobility management, network slice selection, and SMF selection; serving as an anchor for connecting N1 signaling and N2 signaling and providing the SMF with routing of an N1/N2 SM message; and maintaining and managing UE status information.

The SMF is mainly responsible for all control plane functions of terminal session management in a mobile network, such as session establishment, modification, and release. Specific functions are, for example, selection of a UPF for providing a packet forwarding function, internet protocol (internet protocol, IP) address assignment, and session quality of service (quality of service, QoS) management.

As an anchor point of a protocol data unit (protocol data unit, PDU) session connection, the UPF is mainly responsible for data packet filtering, data transmission/forwarding, rate control, charging information generation, and the like of user equipment.

The UDM network element mainly manages and controls user data, for example, subscription information, including obtaining subscription information from a unified data repository (unified data repository, UDR), and providing the subscription information for another network element (for example, the AMF); generating a 3GPP authentication credential for the terminal; and registering and maintaining a network element that currently serves the terminal.

The UDR network element is mainly configured to store user data, including subscription data invoked by the UDM.

The DN is a network that provides a data transmission service for a user, for example, an IP multimedia subsystem (IP multimedia subsystem, IMS) or an internet network.

Specifically, in the communication system shown in FIG. 1, the terminal accesses the DN by establishing a session and a user plane connection among the terminal, the (R)AN, the UPF, and the DN.

It should be noted that, a network including carrier network elements other than the (R)AN may be referred to as a core network. In a 5G network, the core network includes network elements such as an AMF, an SMF, and a UPF. In FIG. 1, the 5G network is merely used as an example, and the core network elements are not specifically limited.

It should be noted that a network architecture to which embodiments of this application are applied is not limited to the network architecture shown in FIG. 1. In addition, the network architecture shown in FIG. 1 is merely a diagram of an example architecture, and a quantity of network elements included in the communication system and names of the network elements are not limited. For example, in addition to the network functional entities shown in FIG. 1, the network shown in FIG. 1 may further include another functional entity.

In mobile communication, after being powered on, a terminal accesses a network and enters a connected mode through a registration procedure. For the registration procedure, refer to 3GPP TS 23.502 (5G) and TS 23.401 (4G). A core network sends a system broadcast message to the terminal in a service area. The system broadcast message may include PF and PO calculation parameters used by a user. For example, a SIB message in 5G carries PF and PO calculation parameters in 5G, for example, N, Ns, and DRX parameters.

N is a quantity of paging frames (PFs) in one DRX cycle T. T is the smaller value between a default DRX cycle and a UE specific DRX cycle. Ns is a quantity of paging occasions (POs) in one paging frame (PF).

If a user in the connected mode (which may also be understood as a user corresponding to a USIM in the terminal) has no service, the user may enter an idle mode to sleep. In the idle mode, the terminal uses a DRX (discontinuous reception-sleep and wake-up mechanism) function to reduce power consumption and prolong the battery lifespan. Based on a service requirement of the terminal, for example, when the terminal serves as a called party or there is downlink data to be sent to the terminal, a network side wakes up the terminal by using a paging mechanism, so that the terminal re-enters the connected mode.

Specifically, when the user in the idle mode (the user corresponding to the USIM in the terminal) needs to be woken up, a core network element sends a paging message to an access network device, where the paging message includes PF and PO calculation parameters (for example, an S-TMSI and a DRX parameter). The access network device determines the PF and the PO based on the PF and PO calculation parameters, and sends a paging signal at a position of the PO in the PF.

Correspondingly, the USIM in the terminal determines the PF and the PO based on the PF and PO calculation parameters. In one paging DRX cycle, the terminal monitors a PDCCH at the position of the PO in the PF. Based on a P-RNTI or an S-TMSI and a corresponding frequency resource and coding format indication on the PDCCH, the user can read a corresponding paging message, determine to be paged, and enter the connected mode to access a core network.

Specifically, PF and PO calculation algorithms are different in different communication systems. This is not specifically limited or described in embodiments of this application. PF and PO calculation algorithms in 5G are used as an example. The PF and PO calculation algorithms in 5G include the following two steps (refer to 3GPP TS 38.304).

Step 1: Determine a position of a paging frame PF, where all system frame numbers (system frame number, SFN) satisfying a formula 1 are PFs.

$$(\text{SFN}+\text{PF\_offset}) \bmod T=(T \text{ div } N)*(\text{UE\_ID} \bmod N) \quad \text{(Formula 1)}$$

mod is a modulo operation, and div is an exact division operation.

SFN is a number of a system frame in which a terminal is currently located.

PF_offset is a preset compensation value, which is determined by a RAN and broadcast to the terminal by using an SIB message.

T is determined by using a DRX parameter and T=min (Tc, Tue), where Tc indicates a paging cycle DRX parameter set by a core network (where Tc is the foregoing terminal-specific DRX parameter, which is a terminal-specific DRX parameter negotiated between the terminal and the core network and is recorded inside the terminal or obtained from a paging message that is over an S1 interface and that is sent by a core network element to an access network device), and Tue indicates a paging cycle DRX parameter set on the RAN (where Tue is the foregoing default DRX, which may also be referred to as a default paging cycle and is read from the SIB). min indicates a minimum value.

N is determined by the RAN and broadcast to the UE by using the SIB message.

UE_ID=S-TMSI mod 1024. The S-TMSI is included in the paging message over the S1 interface and UE_ID is calculated through S-TMSI modulo 1024. The S-TMSI is a least significant bit part of a GUIT.

Step 2: Determine a paging occasion.

The PO is a subframe number of a PDCCH, in the paging frame, that the terminal needs to monitor. After the PF is calculated based on the formula 1, a position i_s, in the PF, of the PO of the terminal needs to be calculated based on a formula 2, and then based on a mapping relationship between i_s and the PO (for example, the mapping relationship is preconfigured in the terminal), an accurate time position of occurrence of the PDCCH physical channel that the terminal needs to monitor is accurately obtained.

$$i\_s=\text{floor}(\text{UE\_ID}/N) \bmod Ns \quad \text{(Formula 2)}$$

Ns is determined by the RAN and broadcast to the terminal by using the SIB message; for UE_ID, refer to content of UE_ID in the formula 1; and floor is a floor operation.

Figure 2:
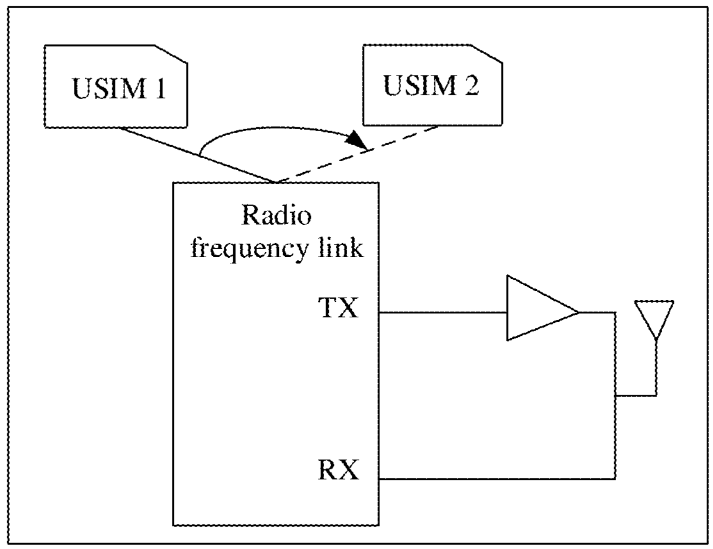
FIG. 2 is a schematic diagram of an inner structure of a terminal according to an embodiment of this application.

Currently, a terminal may have a plurality of card slots; one UICC on a terminal device stores a plurality of USIMs; a plurality of USIMs may be stored in a terminal device without a UICC, that is, in a manner of soft SIMs or soft USIMs, so that the plurality of USIMs may be deployed. In this specification, an example in which two USIMs are deployed in a terminal is used to describe a communication capability of the terminal when a plurality of USIMs are deployed in the terminal. FIG. 1 and FIG. 2 illustrate two different terminal interiors.

FIG. 2 shows an internal structure of a terminal. Two USIMs (shown as a USIM 1 and a USIM 2) are deployed in the terminal. A set of radio frequency circuits is deployed in the terminal. The radio frequency circuit includes a receive port (Rx) and a transmit port (transmit, Tx). A downlink communication capability of the terminal is that the terminal can receive, at the same time, only a network signal of a PLMN corresponding to one USIM.

Figure 3:
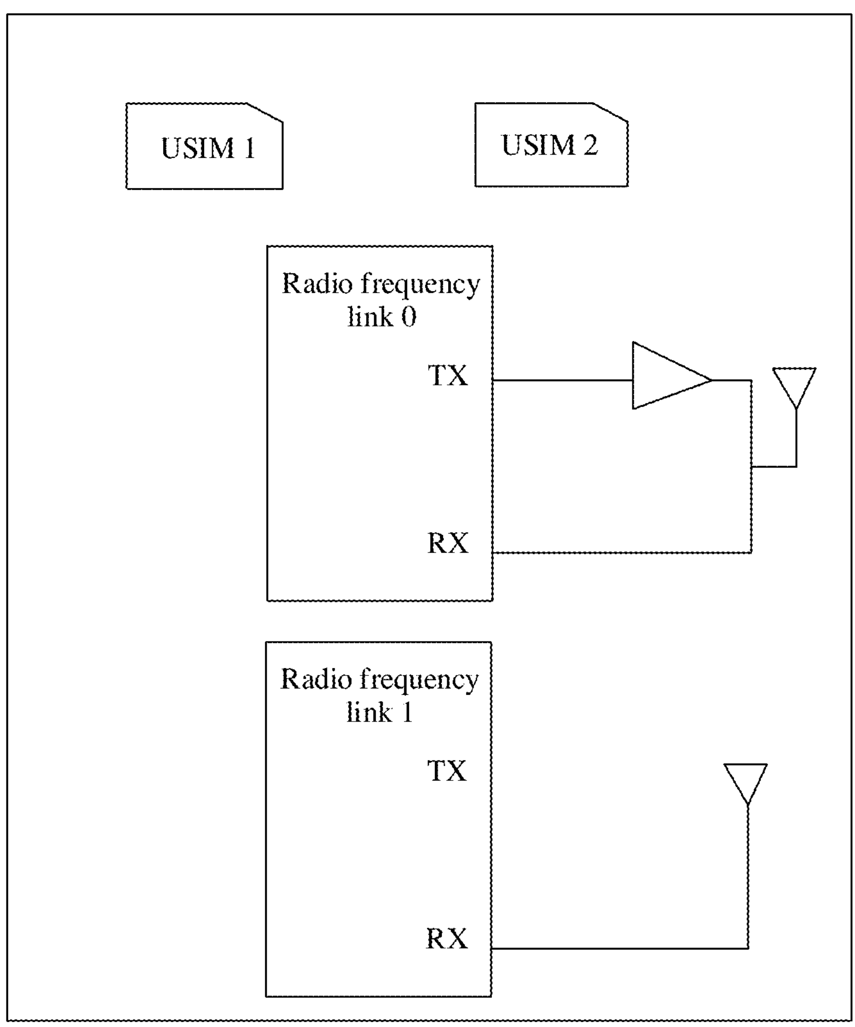
FIG. 3 is a schematic diagram of an inner structure of another terminal according to an embodiment of this application.

FIG. 3 shows an internal structure of another terminal. Two USIMs (shown as a USIM 1 and a USIM 2) are deployed in the terminal. Two sets of radio frequency circuits are deployed in the terminal, but a signal transceiver mechanism that only a network signal of a PLMN corresponding to one USIM is received at the same time is configured.

For the examples shown in FIG. 2 and FIG. 3, this application is applicable to the following scenario: A plurality of USIMs are deployed in a terminal, and a communication capability of the terminal is that the terminal can receive, at the same time, only a network signal of a PLMN corresponding to one USIM. Different USIMs in the plurality of USIMs deployed in the terminal may belong to a same mobile network operator (mobile network operator, MNO), or may belong to different MNOs.

Figure 4:
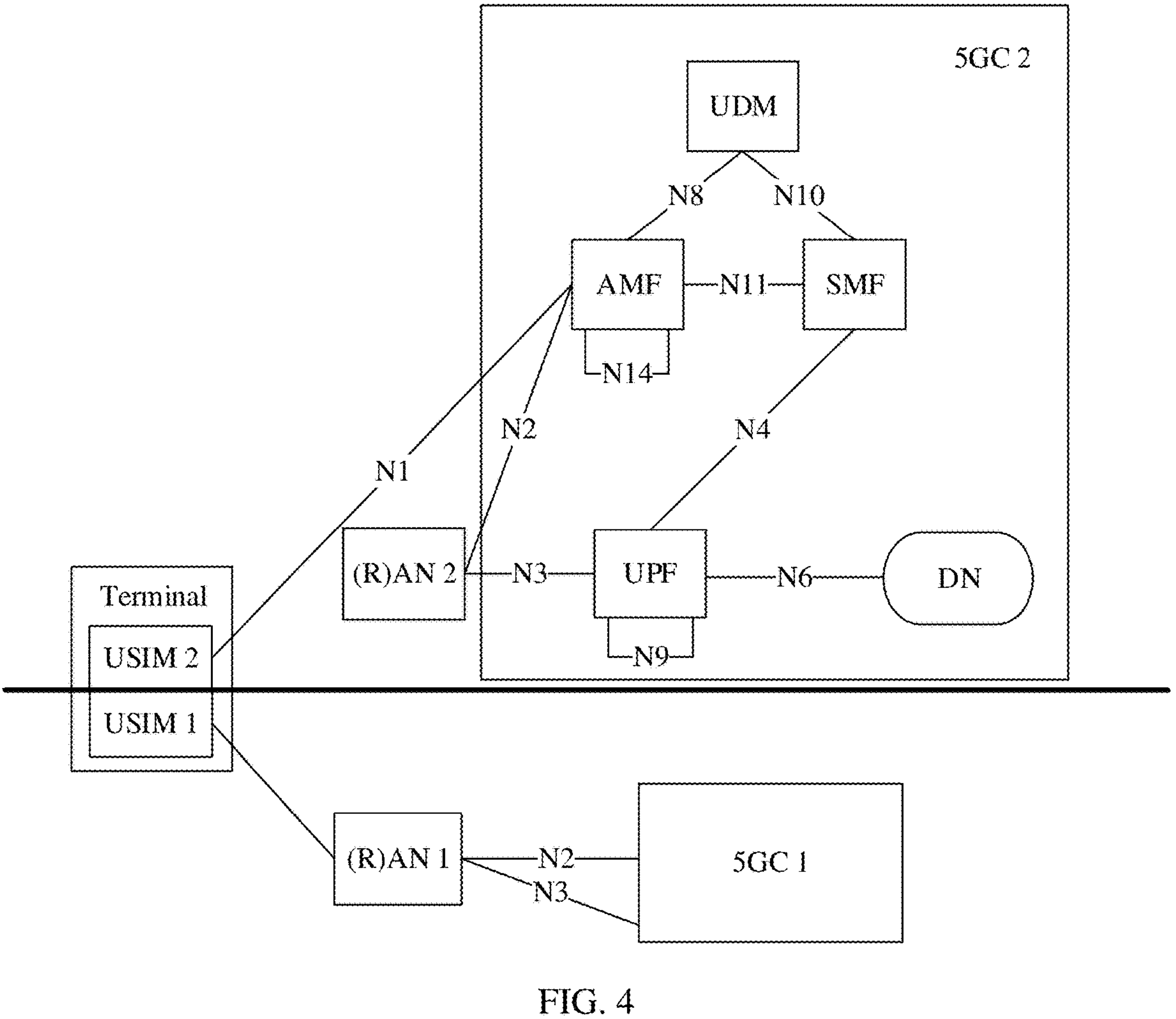
FIG. 4 is a schematic diagram of a communication scenario according to an embodiment of this application.

For the examples shown in FIG. 2 and FIG. 3, this application is applicable to a scenario shown in FIG. 4. As shown in FIG. 4, it is assumed that two USIMs (a USIM 1 and a USIM 2) are deployed in a terminal, and access technologies of the two USIMs are both 5G access. The USIMs of the terminal perform independent signaling/data exchange with 5G core networks (5G Core network, 5GC) (a 5GC 1 and a 5GC 2 in FIG. 4) in respective PLMNs through respective (R)ANs (a (R)AN 1 and a (R)AN 2 in FIG. 4). Two PLMNs do not share their terminal (USIM) information with each other.

Based on this, the solution provided in this application includes: A terminal determines that POs of at least two USIMs are the same. For example, a first PO of a first USIM is the same as a PO of a second USIM. The terminal and a network may obtain, in any one of the following manners, a parameter used to calculate a second PO of the first USIM: Manner 1: A mobility management network element determines a first parameter and sends the first parameter to the terminal, where the first parameter is a parameter used to calculate the second PO of the first USIM. Manner 2: The terminal determines a second parameter and sends the second parameter to the network, where the second parameter is a parameter used to calculate the second PO of the first USIM. Manner 3: The terminal determines a third parameter and sends the third parameter to the network, and the network determines a fourth parameter based on the third parameter and sends the fourth parameter to the terminal. The second PO of the first USIM is different from the PO of the second USIM, so that when the terminal includes a plurality of USIM cards, the terminal can receive a paging signal of each USIM, to ensure a communication capability of the terminal.

In this application, the first PO of the first USIM is a PO that is of the first USIM and that is determined by using a parameter delivered by using a system broadcast message and a parameter (an initial parameter) that is of the first USIM and that is stored in the terminal. The PO of the second USIM is a PO that is of the second USIM and that is determined by using a parameter delivered by using a system broadcast message and a parameter (an initial parameter) that is of the second USIM and that is stored in the terminal. The second PO of the first USIM is a PO that is of the first USIM and that is determined based on the first parameter or the second parameter and the parameter that is of the first USIM and that is stored in the terminal.

The following describes implementations of embodiments of this application in detail with reference to the accompanying drawings. In solutions shown in FIG. 5 and FIG. 6, a mobility management network element determines a first parameter and sends the first parameter to a terminal, and the terminal and a network separately calculate a second PO of a first USIM based on the first parameter. In a solution shown in FIG. 7, a terminal determines a second parameter and sends the second parameter to a network, and the terminal and the network separately calculate a second PO of a first USIM based on the second parameter. In a solution shown in FIG. 8, a terminal determines a third parameter and sends the third parameter to a network, the network determines a fourth parameter based on the third parameter and sends the fourth parameter to the terminal, and the terminal and the network separately calculate a second PO of a first USIM based on the fourth parameter.

It should be noted that in the following embodiments of this application, names of messages between network elements, names of parameters in messages, or the like are merely examples, and may be other names during specific implementation. This is not specifically limited in embodiments of this application.

Figure 5:
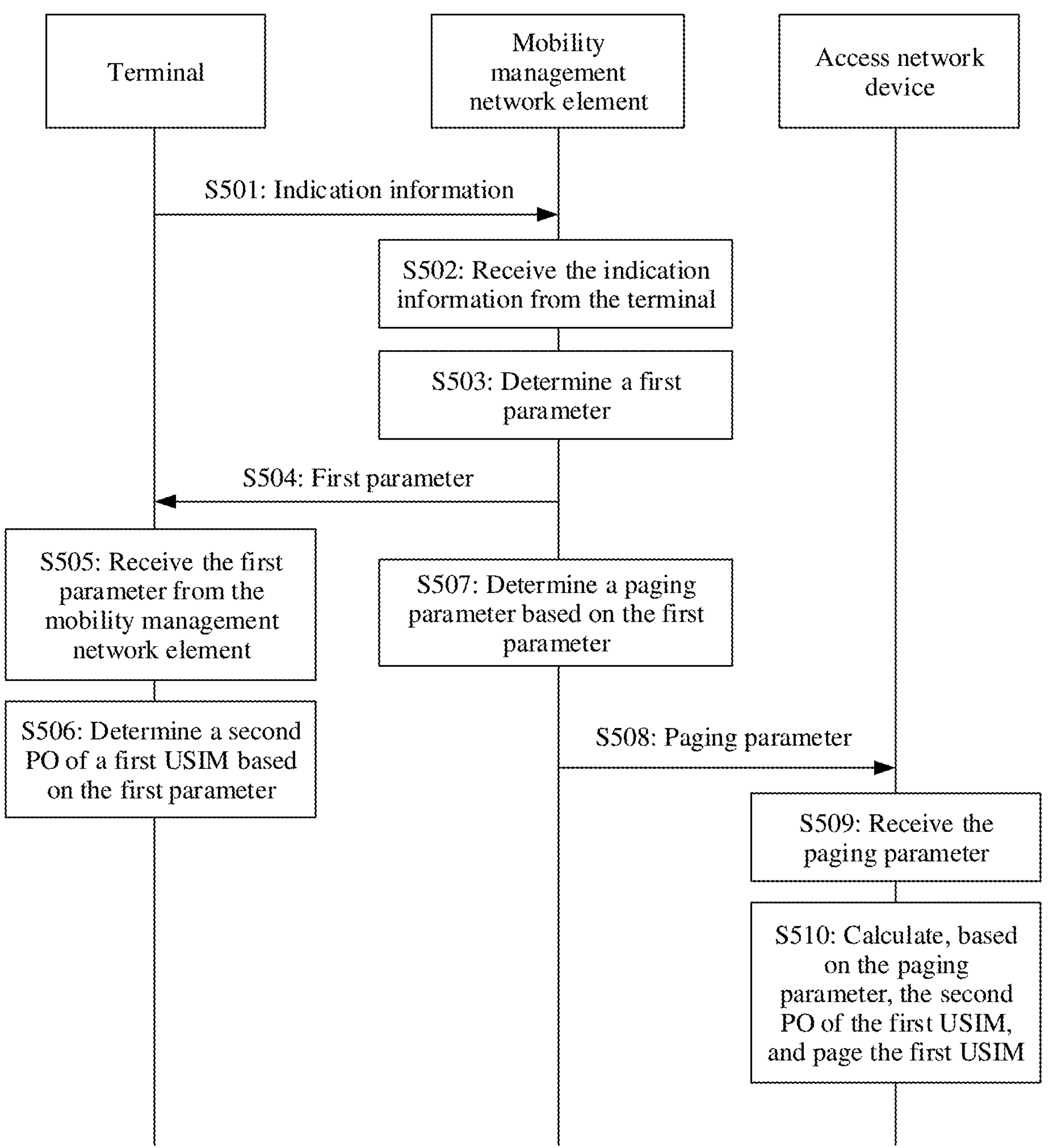
FIG. 5 is a schematic flowchart of a method for determining a PO of a terminal according to an embodiment of this application.

FIG. 5 is a flowchart of a method for determining a PO of a terminal according to an embodiment of this application. In FIG. 5, a mobility management network element determines a first parameter and sends the first parameter to the terminal, where the first parameter is a parameter used to calculate a second PO of a first USIM. As shown in FIG. 5, the method may include the following steps.

S501: When a first PO of the first USIM is the same as a PO of a second USIM, the terminal sends indication information to the mobility management network element communicating with the first USIM. The indication information may be used to indicate that POs of at least two USIMs in the terminal are the same.

For example, the indication information may be used to indicate that the first PO of the first USIM is the same as the PO of the second USIM.

The first USIM is either one of two USIMs whose POs collide in the terminal. For example, the first USIM is the USIM 1 in FIG. 2, and the second USIM is the USIM 2 in FIG. 2; or the first USIM is the USIM 1 in FIG. 3, and the second USIM is the USIM 2 in FIG. 3.

The PO collision described in this application may mean that POs of at least two USIMs are the same. Details are not described one by one in subsequent content.

In a possible implementation, when access technologies of colliding USIMs are different, the terminal selects a USIM corresponding to the latest-generation access technology as the first USIM.

For example, when the access technologies of the colliding USIMs are 4G access and 5G access, the terminal selects the USIM corresponding to the 5G access as the first USIM.

Specifically, the indication information may be sent by using signaling or a request message. The signaling or the request message may be existing signaling or an existing request message, or newly defined signaling or a newly defined request message. This is not specifically limited in embodiments of this application. For example, the indication information may be sent by using a re-registration request message (registration request message).

Optionally, an implementation form of the indication information may include but is not limited to any one of the following:

Implementation 1: The indication information may be a field or an information element that is specified in a protocol and that is specifically used to indicate that POs of at least two USIMs in the terminal are the same. A type and a form of the field or the information element are not specifically limited in embodiments of this application.

Implementation 2: In a communication system, that a PO determining parameter is used as the indication information indicating that POs of at least two USIMs in the terminal are the same is specified in a protocol.

For example, the indication information may include an initial parameter. The initial parameter includes a parameter used to determine the first PO of the first USIM and a parameter used to determine the PO of the second USIM, where the parameters are broadcast by a network side. Content and a determining manner of the initial parameter are described herein. Details are not described one by one in subsequent content. For example, the initial parameter may include N and Ns that correspond to the first USIM, N and Ns that correspond to the second USIM, a terminal-specific DRX parameter of the second USIM, and a default DRX parameter of the second USIM. In this implementation, the terminal sends the initial parameter, and the initial parameter is used by the mobility management network element to verify the determined first parameter during determining of the first parameter, to ensure that the second PO that is of the first USIM and that is determined based on the first parameter is different from the PO of the second USIM.

S502: The mobility management network element communicating with the first USIM in the terminal receives the indication information from the terminal.

The indication information received by the mobility management network element in S502 is the indication information sent by the terminal in S501.

S503: After receiving the indication information, the mobility management network element determines the first parameter.

The first parameter is used to determine the second PO of the first USIM, and the second PO of the first USIM is different from the PO of the second USIM in the terminal.

The first parameter may include a GUTI and/or a DRX parameter. When the first parameter includes the GUTI, the GUTI in the first parameter is different from a GUTI in the initial parameter, or a least significant bit value that is of the GUTI in the first parameter and that participates in PO calculation is different from a least significant bit value that is of the GUTI in the initial parameter and that participates in PO calculation. When the first parameter includes the DRX parameter, the DRX parameter is a terminal-specific DRX parameter (UE specific DRX). A specific process is not described in this application.

Optionally, when forms of the indication information received in step S502 are different, processes of determining the first parameter by the mobility management network element after receiving the indication information in S503 are also different. The processes may specifically include but are not limited to the following specific implementations.

Manner 1: If the mobility management network element receives the initial parameter from the terminal in addition to the indication information, the mobility management network element determines the first parameter based on the initial parameter.

For example, the mobility management network element may adjust values of a part of or all parameters of the initial parameter based on the initial parameter, to obtain the first parameter. For example, the mobility management network element may adjust the GUTI and/or the DRX parameter in the initial parameter based on the initial parameter. Then, the mobility management network element calculates the PO based on a parameter obtained through adjustment, and if the PO calculated by using the parameter obtained through adjustment is different from the PO calculated by using the initial parameter, the parameter obtained through adjustment is used as the first parameter.

Manner 2: If the mobility management network element does not receive the initial parameter, the mobility management network element randomly determines the first parameter.

The random determining process is not limited in embodiments of this application. If the second PO that is of the first USIM and that is randomly determined by the mobility management network element based on the first parameter is the same as the PO of the second USIM, the terminal may perform S501 again until the second PO that is of the first USIM and that is randomly determined by the mobility management network element based on the first parameter is different from the PO of the second USIM in the terminal.

S504: The mobility management network element sends the first parameter to the terminal.

The first parameter sent by the mobility management network element in S504 is the first parameter determined by the mobility management network element in S503.

The first parameter may be sent by using signaling, a request message, or a request response message. The signaling, the request message, or the request response message may be existing signaling, an existing request message, or an existing request response message; or newly defined signaling, a newly defined request message, or a newly defined request response message. This is not specifically limited in embodiments of this application.

For example, the first parameter may be sent by using a response message of the re-registration request message (registration request message).

S505: The terminal receives the first parameter from the mobility management network element.

The first parameter received by the terminal in S505 is the first parameter sent by the mobility management network element in S504.

S506: The terminal determines the second PO of the first USIM based on the first parameter.

The second PO of the first USIM is different from the PO of the second USIM.

Specifically, in S506, the terminal determines the second PO of the first USIM based on the first parameter and a PO calculation algorithm in a communication system accessed by the first USIM. A specific PO calculation process has been described in detail in the foregoing content. Details are not described herein again.

Optionally, after S506, the terminal may monitor, based on the determined second PO and the latest DRX cycle, a signal to wait for being paged.

S507: The mobility management network element determines a paging parameter based on the first parameter.

The paging parameter is used by the mobility management network element to determine the second PO of the first USIM.

Optionally, the paging parameter may include an S-TMSI and/or a DRX parameter.

Specifically, that the mobility management network element determines the paging parameter based on the first parameter in S507 means that the mobility management network element selects, from the first parameter, a PO calculation parameter as the paging parameter.

S508: When paging the first USIM, the mobility management network element sends the paging parameter to an access network device.

The paging parameter is used to determine a PO of the first USIM.

For example, in S508, the mobility management network element may send a paging message carrying the paging parameter.

An occasion for paging the first USIM may be a case in which the terminal serves as a called party or there is downlink data to be sent to the terminal, and S508 may be performed on the occasion.

Specifically, there may be one or more access network devices in S508, and the one or more access network devices may be access network devices communicating with the mobility management network element, or may be access network devices determined in another manner. This is not limited.

S509: The access network device receives the paging parameter from the mobility management network element.

S510: The access network device calculates, based on the paging parameter, the second PO of the first USIM, and pages the first USIM on the second PO of the first USIM.

Specifically, in S510, the access network device determines the second PO of the first USIM based on the paging parameter and the PO calculation algorithm in the communication system. A specific PO calculation process has been described in detail in the foregoing content. Details are not described herein again.

The second PO that is of the first USIM and that is determined by the access network device in S510 is the same as the second PO that is of the first USIM and that is determined by the terminal in S506. After S510, the access network device may page the first USIM based on the determined second PO and the latest DRX cycle.

According to the method for determining the PO of the terminal provided in this application, when determining that POs of two USIMs in the terminal are the same, the terminal requests, by using the indication information, the mobility management network element to configure the parameter used to determine the second PO of the first USIM, to change the PO of one of the USIMs whose POs are the same, so as to ensure that the POs of the USIMs in the terminal are not the same. Even if the terminal can receive, at the same time, only a network signal of a PLMN corresponding to one USIM, the terminal can also receive a paging signal of each USIM, so that a communication capability of the terminal is ensured.

Figure 6:
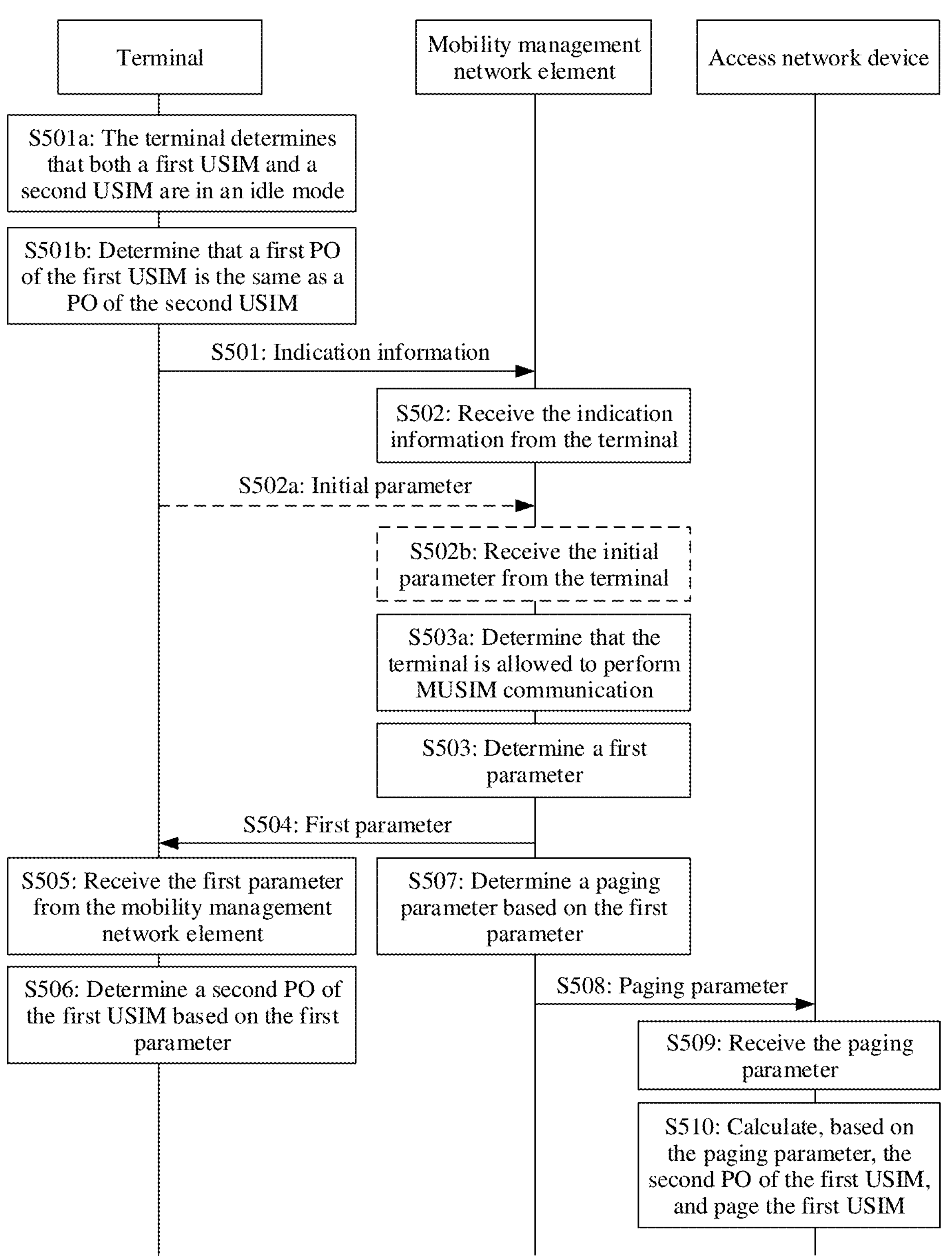
FIG. 6 is a schematic flowchart of another method for determining a PO of a terminal according to an embodiment of this application.

Based on the flowchart shown in FIG. 5, FIG. 6 further includes one or more of the following optional steps: S501*a*, S501*b*, S502*a*, S502*b*, or S503*a*. Other steps in FIG. 6 are the same as the steps in the flowchart of the method for determining the PO of the terminal shown in FIG. 5. For details, refer to the descriptions of FIG. 5. Details are not described one by one herein again.

As shown in FIG. 6, optionally, before S501 is performed, the method for determining the PO of the terminal provided in this embodiment of this application may further include S501*a*.

S501*a*: The terminal determines that both the first USIM and the second USIM are in an idle mode.

It should be understood that, that a USIM is in the idle mode may also be referred to as that a terminal in which the USIM is located is in the idle mode, or may also be referred to as that a user corresponding to the USIM is in the idle mode, or the like. These descriptions may be equivalently replaced with each other.

Optionally, before S501 is performed, the method for determining the PO of the terminal provided in this embodiment of this application may further include S501*b*.

S501*b*: The terminal determines that the first PO of the first USIM is the same as the PO of the second USIM.

Specifically, the terminal may separately calculate the first PO of the first USIM and the PO of the second USIM based on the initial parameter and PO calculation algorithms in communication systems accessed by the USIMs, to determine that the first PO of the first USIM is the same as the PO of the second USIM.

A sequence of steps S501*a* and S501*b* is not limited in this application. In other words, S501*a* may be performed before S501*b*, S501*a* may be performed after S501*b*, or S501*a* and S501*b* are performed simultaneously.

Optionally, if an implementation of the indication information in step S501 is the implementation 1, before S503 is performed, the method for determining the PO of the terminal provided in this embodiment of this application may further include S502*a* and S502*b*.

S502*a*: The terminal sends the initial parameter to the mobility management network element communicating with the first USIM. The initial parameter includes the parameter used to determine the first PO of the first USIM and the parameter used to determine the PO of the second USIM, where the parameters are broadcast by the network side. For example, the initial parameter may include N and Ns that correspond to the first USIM, N and Ns that correspond to the second USIM, the terminal-specific DRX parameter of the second USIM, and the default DRX parameter of the second USIM.

S502*b*: The mobility management network element communicating with the first USIM in the terminal receives the initial parameter from the terminal.

Optionally, before S503 is performed, the method for determining the PO of the terminal provided in this embodiment of this application may further include S503*a*.

S503*a*: The mobility management network element obtains a subscription parameter of the terminal from a UDM, and determines that the terminal is allowed to perform multi-SIM (MUSIM) communication.

That the terminal is allowed to perform MUSIM communication may mean that the terminal allows a collision avoidance mechanism when a PO collision occurs in the MUSIM communication.

According to another aspect, an embodiment of this application provides a method for determining a PO of a terminal. The method is applied to an interaction process among the terminal, a mobility management network element, and an access network device. The terminal includes a first USIM and a second USIM, and the first USIM and the second USIM are any two USIMs whose POs are the same in a plurality of USIMs deployed in the terminal. When POs of more than two USIMs in the terminal are the same, every two of the USIMs whose POs are the same may be grouped, and two USIMs in each group are used as the first USIM and the second USIM to perform the solution provided in this application to resolve the PO collision.

Figure 7:
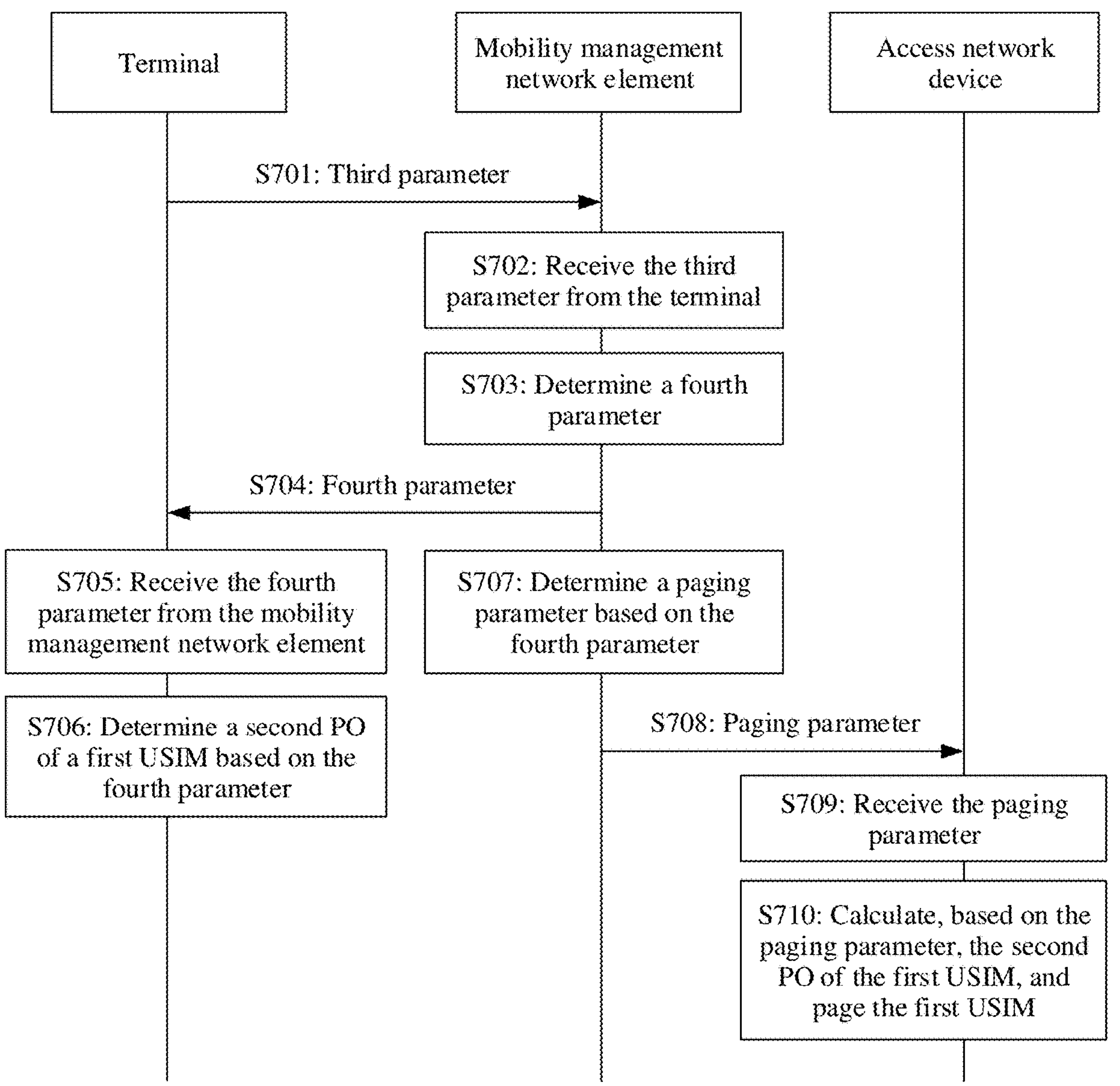
FIG. 7 is a schematic flowchart of still another method for determining a PO of a terminal according to an embodiment of this application.

FIG. 7 is a flowchart of a method for determining a PO of a terminal according to an embodiment of this application. As shown in FIG. 7, the method may include the following steps.

S701: When a first PO of a first USIM is the same as a PO of a second USIM, the terminal sends a third parameter to a mobility management network element communicating with the first USIM.

The first USIM is either one of two USIMs whose POs collide in the terminal. For example, the first USIM is the USIM 1 in FIG. 2, and the second USIM is the USIM 2 in FIG. 2; or the first USIM is the USIM 1 in FIG. 3, and the second USIM is the USIM 2 in FIG. 3.

In a possible implementation, when access technologies of colliding USIMs are different, the terminal selects a USIM corresponding to the latest-generation access technology as the first USIM.

For example, when the access technologies of the colliding USIMs are 4G access and 5G access, the terminal selects the USIM corresponding to the 5G access as the first USIM.

The third parameter is a parameter that is determined by the terminal and that is used to determine a second PO of the first USIM to avoid a PO collision, and values of a part of or all parameters in the third parameter are different from those in an initial parameter. The terminal may adjust the different values of the part of or all parameters based on the initial parameter, to obtain the third parameter. An adjustment method is not specifically limited in embodiments of this application.

The third parameter may include a GUTI and/or a DRX parameter. When the third parameter includes the GUTI, the GUTI in the third parameter is different from a GUTI in the initial parameter, or a least significant bit value that is of the GUTI in the third parameter and that participates in PO calculation is different from a least significant bit value that is of the GUTI in the initial parameter and that participates in PO calculation. When the third parameter includes the DRX parameter, the DRX parameter is a terminal-specific DRX parameter (UE specific DRX) and is determined through negotiation between the terminal and the mobility management network element. A specific process is not described in this application.

Specifically, the third parameter may be sent by using signaling or a request message. The signaling or the request message may be existing signaling or an existing request message, or newly defined signaling or a newly defined request message. This is not specifically limited in embodiments of this application.

For example, the third parameter may be sent by using a re-registration request message (registration request message).

S702: The mobility management network element communicating with the first USIM in the terminal receives the third parameter from the terminal.

The indication information received by the mobility management network element in S702 is the indication information sent by the terminal in S701.

S703: After receiving the third parameter, the mobility management network element determines a fourth parameter.

The fourth parameter is used to determine the second PO of the first USIM, and the second PO of the first USIM is different from the PO of the second USIM in the terminal.

The fourth parameter may include a GUTI and/or a DRX parameter. When the fourth parameter includes the GUTI, the GUTI in the fourth parameter is different from a GUTI in the initial parameter, or a least significant bit value that is of the GUTI in the fourth parameter and that participates in PO calculation is different from a least significant bit value that is of the GUTI in the initial parameter and that participates in PO calculation. When the fourth parameter includes the DRX parameter, the DRX parameter is a terminal-specific DRX parameter (UE specific DRX) and is determined through negotiation between the terminal and the mobility management network element. A specific process is not described in this application.

Specifically, that after receiving the third parameter, the mobility management network element determines the fourth parameter in S703 is determining the fourth parameter based on the third parameter, and specifically includes: The mobility management network element first determines whether the third parameter is the same as a parameter of another terminal. If the third parameter is different from the parameter of the another terminal, the mobility management network element accepts the third parameter, and uses the third parameter as the fourth parameter. If the third parameter is the same as the parameter of the another terminal, the mobility management network element may adjust, based on the third parameter, different values of a part of or all parameters, to obtain the fourth parameter. Alternatively, if the third parameter is the same as the parameter of the another terminal, the mobility management network element requests the terminal to report another value.

For example, the mobility management network element may determine whether to accept and use the GUTI in the third parameter depending on whether the GUTI in the third parameter is the same as (collides) a GUTI that has been allocated by the mobility management network element to another terminal served by the mobility management network element. To be specific, if the GUTIs are different, the GUTI in the third parameter is accepted; or if the GUTIs are the same, the GUTI in the third parameter is not accepted.

S704: The mobility management network element sends the fourth parameter to the terminal.

The fourth parameter sent by the mobility management network element in S704 is the fourth parameter determined by the mobility management network element in S703.

Specifically, the fourth parameter may be sent by using signaling, a request message, or a request response message. The signaling, the request message, or the request response message may be existing signaling, an existing request message, or an existing request response message; or newly defined signaling, a newly defined request message, or a newly defined request response message. This is not specifically limited in embodiments of this application.

For example, the fourth parameter may be sent by using a response message of the re-registration request message (registration request message).

In a possible implementation, when the fourth parameter is the same as the third parameter, that the mobility management network element sends the fourth parameter to the terminal in S704 may be replaced by: The mobility management network element sends acceptance indication information to the terminal, where the reception indication information is used to indicate that the third parameter sent by the terminal is accepted.

S705: The terminal receives the fourth parameter from the mobility management network element.

The fourth parameter received by the terminal in S705 is the fourth parameter sent by the mobility management network element in S704.

In a possible implementation, when the fourth parameter is the same as the third parameter, that the terminal receives the fourth parameter from the mobility management network element in S705 may be replaced by: The terminal receives acceptance indication information from the mobility management network element, where the acceptance indication information is used to indicate that the third parameter sent by the terminal is accepted. In this case, the fourth parameter is the third parameter.

S706: The terminal determines the second PO of the first USIM based on the fourth parameter.

The second PO of the first USIM is different from the PO of the second USIM.

Specifically, in S706, the terminal determines the second PO of the first USIM based on the fourth parameter and a PO calculation algorithm in a communication system accessed by the first USIM. A specific PO calculation process has been described in detail in the foregoing content. Details are not described herein again.

After S706, the terminal may monitor, based on the determined second PO and the latest DRX cycle, a signal to wait for being paged.

S707: The mobility management network element determines a paging parameter based on the fourth parameter.

The paging parameter is used by the mobility management network element to determine the second PO of the first USIM.

Optionally, the paging parameter may include an S-TMSI and/or the DRX parameter.

Specifically, that the mobility management network element determines the paging parameter based on the fourth parameter in S707 means that the mobility management network element selects, from the fourth parameter, a PO calculation parameter as the paging parameter.

S708: When paging the first USIM, the mobility management network element sends the paging parameter to an access network device.

The paging parameter is used to determine a PO of the first USIM.

For example, in S708, the mobility management network element may send a paging message carrying the paging parameter.

An occasion for paging the first USIM may be a case in which the terminal serves as a called party or there is downlink data to be sent to the terminal, and S708 may be performed on the occasion.

Specifically, there may be one or more access network devices in S708, and the one or more access network devices may be access network devices communicating with the mobility management network element, or may be access network devices determined in another manner. This is not limited.

S709: The access network device receives the paging parameter from the mobility management network element.

S710: The access network device calculates, based on the paging parameter, the second PO of the first USIM, and pages the first USIM on the second PO of the first USIM.

Specifically, in S710, the access network device determines the second PO of the first USIM based on the paging parameter and the PO calculation algorithm in the communication system. A specific PO calculation process has been described in detail in the foregoing content. Details are not described herein again.

For a specific implementation of S710, refer to the specific implementation of S510. Details are not described again.

According to the method for determining the PO of the terminal provided in this application, when the terminal determines that POs of two USIMs in the terminal are the same, the terminal and the mobility management network element negotiate to determine the parameter used to determine the second PO of the first USIM, to change the PO of one of the USIMs whose POs are the same, so as to ensure that the POs of the USIMs in the terminal are not the same. Even if the terminal can receive, at the same time, only a network signal of a PLMN corresponding to one USIM, the terminal can also receive a paging signal of each USIM, so that a communication capability of the terminal is ensured.

Further, before S701, the method for determining the PO of the terminal provided in this embodiment of this application may further include: The terminal determines that both the first USIM and the second USIM are in an idle state, and then performs S701.

Further, before S701, the method for determining the PO of the terminal provided in this embodiment of this application may further include: The terminal determines that the first PO of the first USIM is the same as the PO of the second USIM. For a specific implementation thereof, refer to S501*b*.

Further, before S704, the method for determining the PO of the terminal provided in this embodiment of this application may further include: The mobility management network element obtains a subscription parameter of the terminal from a UDM, and determines that the terminal is allowed to perform MUSIM communication.

According to another aspect, an embodiment of this application provides a method for determining a PO of a terminal. The method is applied to an interaction process among the terminal, a mobility management network element, and an access network device. The terminal includes a first USIM and a second USIM, and the first USIM and the second USIM are any two USIMs whose POs are the same in a plurality of USIMs deployed in the terminal. When POs of more than two USIMs in the terminal are the same, every two of the USIMs whose POs are the same may be grouped, and two USIMs in each group are used as the first USIM and the second USIM to perform the solution provided in this application to resolve the PO collision.

Figure 8:
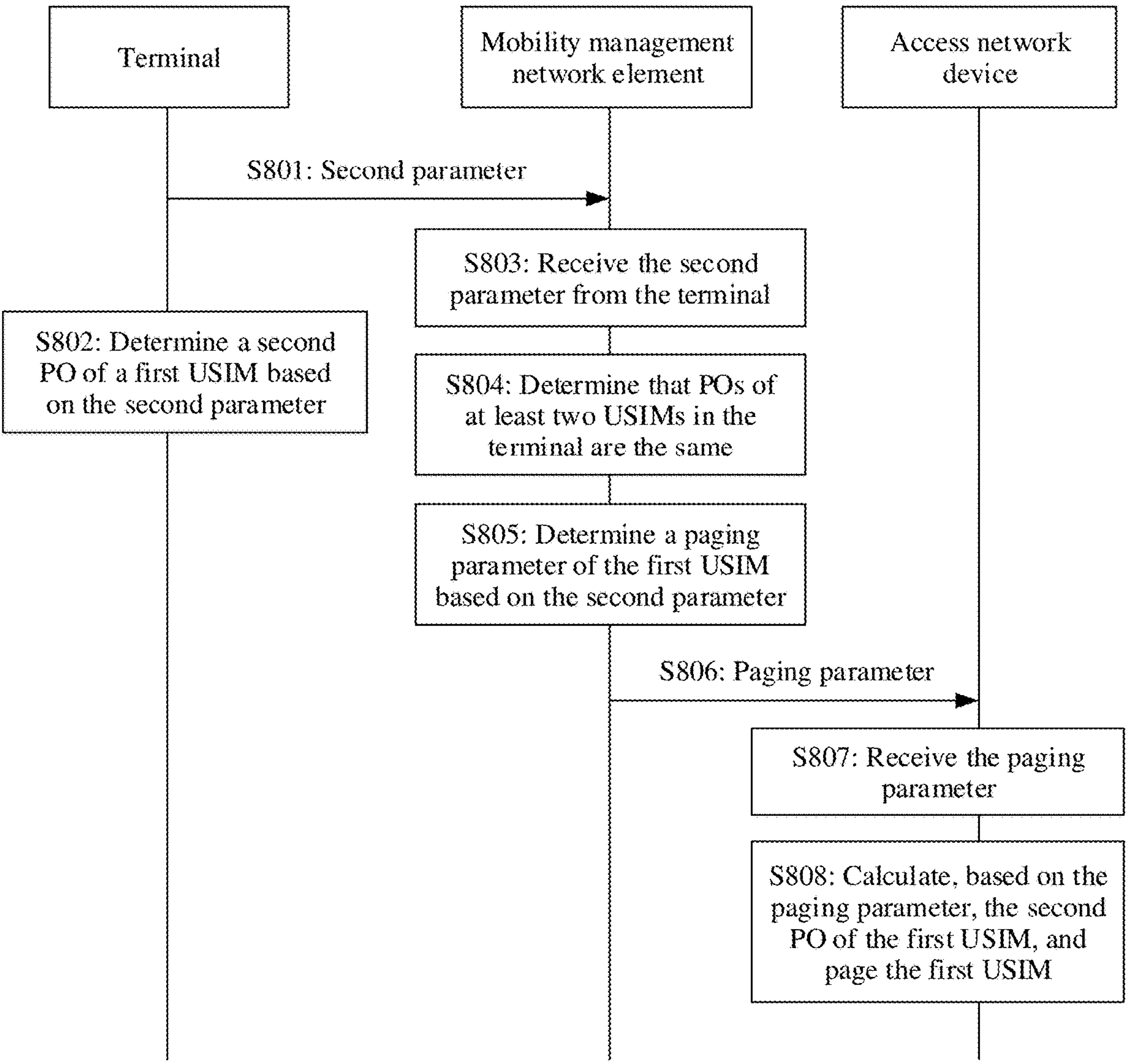
FIG. 8 is a schematic flowchart of yet another method for determining a PO of a terminal according to an embodiment of this application.

FIG. 8 is a flowchart of another method for determining a PO of a terminal according to an embodiment of this application. As shown in FIG. 8, the method may include the following steps.

S801: When a first PO of a first USIM is the same as a PO of a second USIM, the terminal sends a second parameter to a mobility management network element communicating with the first USIM.

Content of the second parameter has been described in detail in S501. Details are not described herein again.

Specifically, the second parameter may be sent by using signaling or a request message. The signaling or the request message may be existing signaling or an existing request message, or newly defined signaling or a newly defined request message. This is not specifically limited in embodiments of this application.

For example, the second parameter may be sent by using a re-registration request message (registration request message).

S802: The terminal determines a second PO of the first USIM based on the second parameter.

The second PO of the first USIM is different from the PO of the second USIM.

Specifically, in S802, the terminal determines the second PO of the first USIM based on the second parameter and a PO calculation algorithm in a communication system accessed by the first USIM. A specific PO calculation process has been described in detail in the foregoing content. Details are not described herein again.

After S802, the terminal may monitor, based on the determined second PO and the latest DRX cycle, a signal to wait for being paged.

S803: The mobility management network element communicating with the first USIM in the terminal receives the second parameter from the terminal.

S804: The mobility management network element determines that POs of at least two USIMs in the terminal are the same.

The at least two USIMs whose POs are the same in the terminal in this specification include the first USIM communicating with the mobility management network element.

Specifically, in S804, the mobility management network element may determine, based on content that is agreed upon by the mobility management network element and the terminal and that indicates that POs of at least two USIMs in the terminal are the same, that POs of at least two USIMs in the terminal are the same. The agreed content may be indication information, dedicated signaling, a specific parameter, a field, an information element, or the like. This is not specifically limited in embodiments of this application.

In a possible implementation, that the mobility management network element determines that POs of at least two USIMs in the terminal are the same in S804 may be specifically implemented as follows: The mobility management network element receives indication information from the terminal, where the indication information is used to indicate that the POs of the at least two USIMs in the terminal are the same.

The indication information may be a field or an information element that is specified in a protocol and that is specifically used to indicate that POs of at least two USIMs in the terminal are the same.

In another possible implementation, that the mobility management network element determines that POs of at least two USIMs in the terminal are the same in S804 may be specifically implemented as follows: The mobility management network element receives dedicated signaling from the terminal, where the dedicated signaling is used to indicate that the POs of the at least two USIMs in the terminal are the same. The dedicated signaling may be existing dedicated signaling or newly defined dedicated signaling that is specified in a protocol and that is specifically used to indicate that POs of at least two USIMs in the terminal are the same.

In still another possible implementation, in a communication system, that a PO determining parameter is used to indicate that POs of at least two USIMs in the terminal are the same may be specified in a protocol. When determining that POs of at least two USIMs in the terminal are the same, the terminal sends, to the mobility management network element, the PO determining parameter (for example, an initial parameter or the second parameter). When receiving the PO determining parameter (for example, the initial parameter or the second parameter), the mobility management network element determines that POs of at least two USIMs in the terminal are the same.

S805: The mobility management network element determines a paging parameter of the first USIM based on the second parameter.

The paging parameter is used by the mobility management network element to determine the second PO of the first USIM.

Optionally, the paging parameter may include an S-TMSI and/or a DRX parameter.

It should be noted that for a determining process in S805, refer to the specific implementation of S507. A difference lies in that the paging parameter is determined based on the second parameter in S805, and the paging parameter is determined based on the first parameter in S507.

S806: When paging the first USIM, the mobility management network element sends the paging parameter to an access network device.

It should be noted that, for S805, refer to the specific implementation of S508. Details are not described herein again.

S807: The access network device receives the paging parameter from the mobility management network element.

S808: The access network device calculates, based on the paging parameter, the second PO of the first USIM, and pages the first USIM on the second PO of the first USIM.

Specifically, in S808, the access network device determines the second PO of the first USIM based on the paging parameter and the PO calculation algorithm in the communication system. A specific PO calculation process has been described in detail in the foregoing content. Details are not described herein again.

The second PO that is of the first USIM and that is determined by the access network device in S808 is the same as the second PO that is of the first USIM and that is determined by the terminal in S805. After S808, the access network device may page the first USIM based on the determined second PO and the latest DRX cycle.

According to the method for determining the PO of the terminal provided in this application, when determining that POs of two USIMs in the terminal are the same, the terminal reconfigures the parameter used to determine the second PO of the first USIM, and sends the configured parameter to the mobility management network element, to change the PO of one of the USIMs whose POs are the same, so as to ensure that the POs of the USIMs in the terminal are not the same. Even if the terminal can receive, at the same time, only a network signal of a PLMN corresponding to one USIM, the terminal can also receive a paging signal of each USIM, so that a communication capability of the terminal is ensured.

Further, before S801, the method for determining the PO of the terminal provided in this embodiment of this application may further include: The terminal determines that both the first USIM and the second USIM are idle, and then performs S801.

Further, before S801, the method for determining the PO of the terminal provided in this embodiment of this application may further include: The terminal determines that the first PO of the first USIM is the same as the PO of the second USIM. For a specific implementation thereof, refer to S501*b*.

Further, before S804, the method for determining the PO of the terminal provided in this embodiment of this application may further include: The mobility management network element obtains a subscription parameter of the terminal from a UDM, and determines that the terminal is allowed to perform MUSIM communication.

This application further provides another solution. The solution includes: The terminal determines that POs of at least two USIMs are the same. For example, a first PO of a first USIM is the same as a PO of a second USIM. The terminal and a network calculate a second PO of the first USIM based on a dedicated algorithm. The second PO of the first USIM is different from the PO of the second USIM, so that when the terminal includes a plurality of USIM cards, the terminal can receive a paging signal of each USIM, to ensure a communication capability of the terminal. In the solution shown in FIG. 8, the terminal and the network calculate the second PO of the first USIM based on the dedicated algorithm.

According to still another aspect, an embodiment of this application provides a method for determining a PO of a terminal. The method is applied to an interaction process among the terminal, a mobility management network element, and an access network device. The terminal includes a first USIM and a second USIM, and the first USIM and the second USIM are any two USIMs whose POs are the same in a plurality of USIMs deployed in the terminal. When POs of more than two USIMs in the terminal are the same, every two of the USIMs whose POs are the same may be grouped, and two USIMs in each group are used as the first USIM and the second USIM to perform the solution provided in this application to resolve the PO collision.

Figure 9:
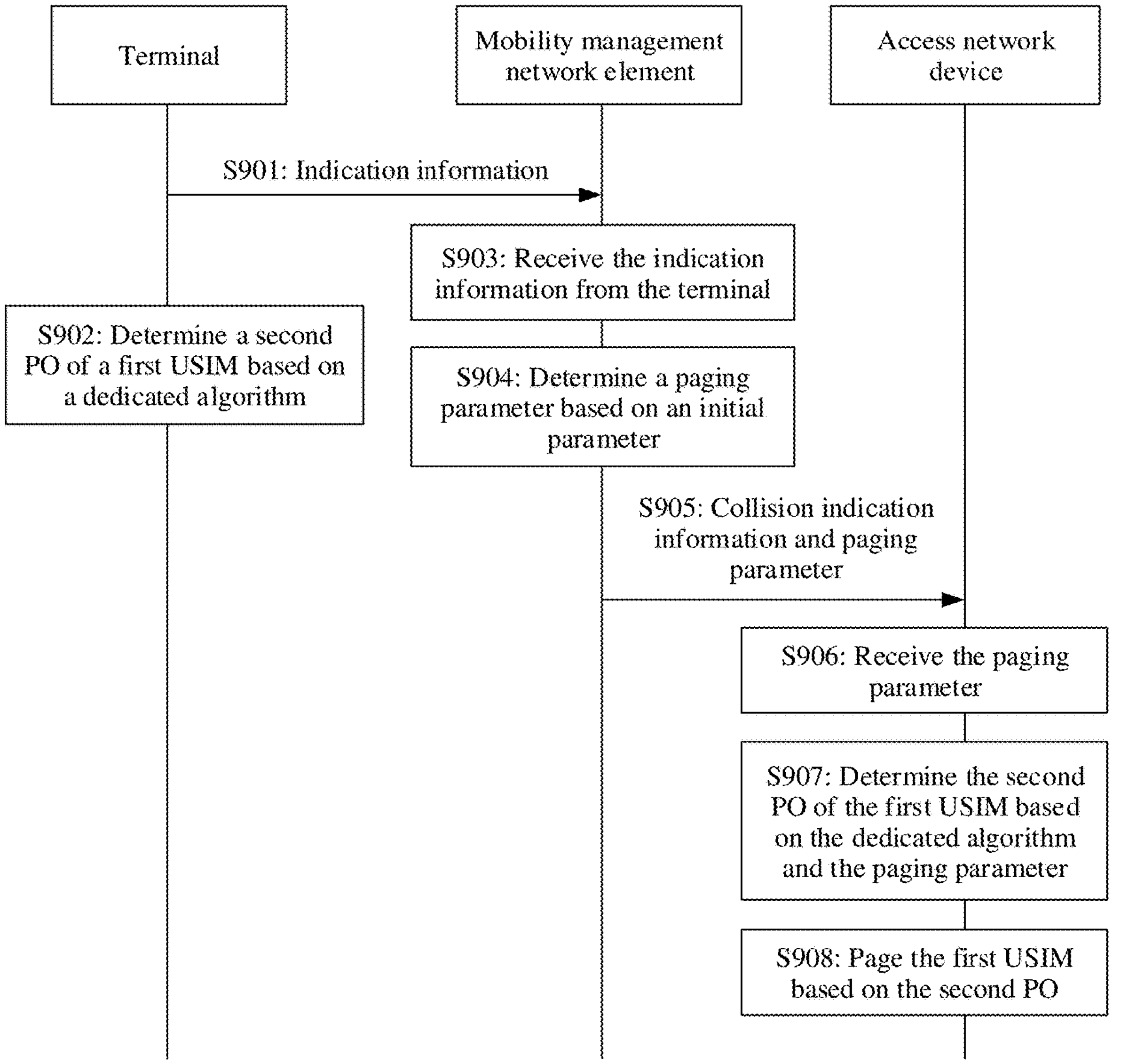
FIG. 9 is a schematic flowchart of still yet another method for determining a PO of a terminal according to an embodiment of this application.

FIG. 9 is a flowchart of a method for determining a PO of a terminal according to an embodiment of this application. As shown in FIG. 9, the method may include the following steps.

S901: When a first PO of a first USIM is the same as a PO of a second USIM, the terminal sends indication information to a mobility management network element communicating with the first USIM.

The indication information is used to indicate that POs of at least two USIMs in the terminal are the same.

It should be noted that, for S901, refer to the specific implementation of S501. Details are not described herein again.

S902: The terminal determines a second PO of the first USIM based on a dedicated algorithm.

The second PO of the first USIM is different from the PO of the second USIM, the first PO of the first USIM is the same as the PO of the second USIM, and the dedicated algorithm is different from an algorithm for determining the first PO of the first USIM. It should be understood that the algorithm for determining the first PO of the first USIM may be a PO determining algorithm defined in a communication system accessed by the first USIM.

Specifically, the dedicated algorithm is an algorithm configured in the system and known to both an access network device and the terminal.

For example, the dedicated algorithm may be adding a preset offset to the PO determining algorithm defined in the communication system. Alternatively, the dedicated algorithm may be a newly defined algorithm completely different from the PO determining algorithm defined in the communication system. Content of the dedicated algorithm is not specifically limited in embodiments of this application.

For example, a 5G system is used as an example. A process of the dedicated algorithm may be the same as a PO determining algorithm defined in 5G, but formulas for calculating a position of a PF and i_s are different from the foregoing formula 1 and/or formula 2. That is, compared with the PO determining algorithm defined in the communication system, the dedicated algorithm may be different only from the formula 1, may be different only from the formula 2, or may be different from both the formula 1 and the formula 2.

For example, the formula for calculating the position of the PF in the dedicated algorithm in 5G may be a formula 3, and per-UE-PF_offset is a preset PF offset. The formula for calculating the position i_s of a PO, in the PF, of the terminal may be a formula 4, and per-UE-i_s_offset is a preset PO offset.

$$(\text{SFN}+\text{PF\_offset}+\text{per-UE-PF\_offset}) \bmod T=(T \text{ div } N)*(\text{UE\_ID} \bmod N) \quad \text{(Formula 3)}$$

$$i\_s+\text{per-UE-}i\_s\text{\_offset}=\text{floor}(\text{UE\_ID}/N) \bmod Ns \quad \text{(Formula 4)}$$

S903: The mobility management network element communicating with the first USIM in the terminal receives the indication information from the terminal.

S904: The mobility management network element determines a paging parameter based on an initial parameter.

The paging parameter is used by the mobility management network element to determine the second PO of the first USIM.

Optionally, the paging parameter may include an S-TMSI and/or a DRX parameter.

It should be noted that for a determining process in S904, refer to the specific implementation of S507. A difference lies in that the paging parameter is determined based on the initial parameter in S904, and the paging parameter is determined based on the first parameter in S507.

S905: When paging the first USIM, the mobility management network element sends collision indication information and the paging parameter to the access network device.

The collision indication information is used to indicate the access network device to determine, based on the dedicated algorithm, the second PO of the first USIM, and page the first USIM on the second PO of the first USIM; or the collision indication information is used to indicate that a PO of the first USIM collides with the PO of the second USIM, so that the access network device determines, based on the dedicated algorithm, the second PO of the first USIM, and pages the first USIM on the second PO of the first USIM; or the collision indication information is used to indicate that a PO that is of the first USIM and that corresponds to the S-TMSI in the paging parameter collides with the PO of the second USIM, so that the access network device determines, based on the dedicated algorithm, the second PO of the first USIM, and pages the first USIM on the second PO of the first USIM.

S906: The access network device receives the paging parameter and the collision indication information from the mobility management network element.

S907: The access network device determines the second PO of the first USIM based on the dedicated algorithm and the paging parameter.

Specifically, in S907, the access network device determines the second PO of the first USIM based on the paging parameter received in S906 and the dedicated algorithm. A specific PO calculation process has been described in detail in the foregoing content. Details are not described herein again.

The second PO that is of the first USIM and that is determined by the access network device in S907 is the same as the second PO that is of the first USIM and that is determined by the terminal in S902.

S908: The access network device pages the first USIM based on the second PO.

According to the method for determining the PO of the terminal provided in this application, when determining that POs of two USIMs in the terminal are the same, the terminal determines the second PO of the first USIM based on the dedicated algorithm, and requests, by using the indication information, the mobility management network element to indicate an access network device to determine the second PO of the first USIM based on the dedicated algorithm, to change the PO of one of the USIMs whose POs are the same, so as to ensure that the POs of the USIMs in the terminal are not the same. Even if the terminal can receive, at the same time, only a network signal of a PLMN corresponding to one USIM, the terminal can also receive a paging signal of each USIM, so that a communication capability of the terminal is ensured.

Further, before S901, the method for determining the PO of the terminal provided in this embodiment of this application may further include: The terminal determines that both the first USIM and the second USIM are idle, and then performs S901.

Further, before S901, the method for determining the PO of the terminal provided in this embodiment of this application may further include: The terminal determines that the first PO of the first USIM is the same as the PO of the second USIM. For a specific implementation thereof, refer to S501*b*.

Further, before S905, the method for determining the PO of the terminal provided in this embodiment of this application may further include: The mobility management network element obtains a subscription parameter of the terminal from a UDM, and determines that the terminal is allowed to perform MUSIM communication.

The following describes in detail the solutions provided in this application by using several specific embodiments, but this constitutes no specific limitation. It is assumed that two USIMs are deployed in a terminal. The two USIMs are respectively recorded as a USIM 1 and a USIM 2. In the following embodiments, POs of the USIM 1 and the USIM 2 are the same. According to the solution of this application, the terminal interacts with an AMF communicating with the USIM 2, to make a second PO of the USIM 2 be different from the PO of the USIM 1.

Embodiment 1

Figure 10:
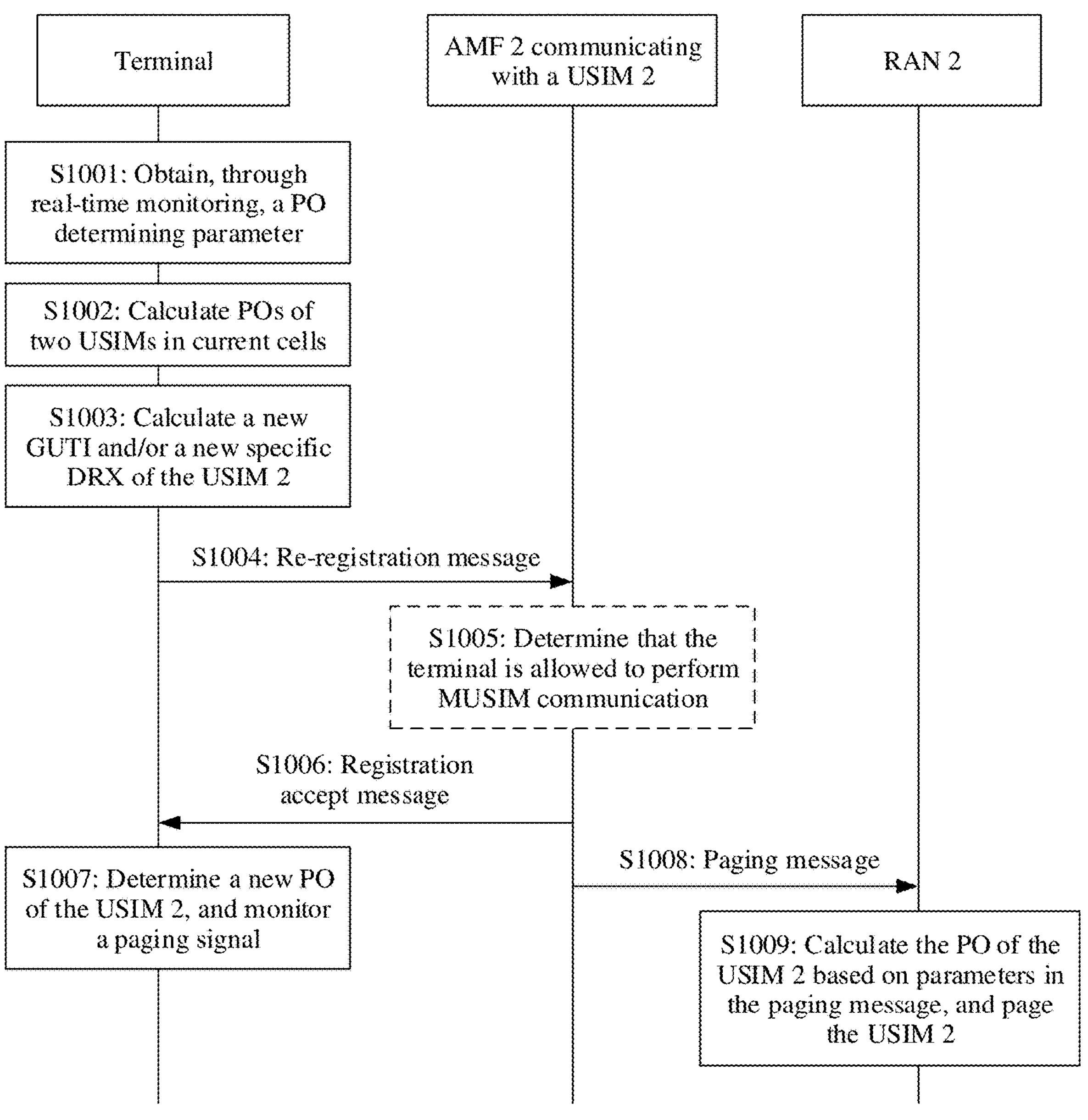
FIG. 10 is a schematic flowchart of a further method for determining a PO of a terminal according to an embodiment of this application.

FIG. 10 shows another method for determining a PO of a terminal according to an embodiment of this application. The method may include the following steps.

S1001: The terminal obtains, through real-time monitoring, a PO determining parameter.

In S1001, the terminal obtains, through real-time monitoring, default DRX, N, and Ns parameters in SIB messages of cells on which the two USIMs currently camp.

Specifically, as the terminal moves, the USIM 1 and the USIM 2 may camp on their respective cells, and default DRX, N, and Ns parameters in the SIB messages of the different cells may be different. The default DRX, N, and Ns parameters in the SIB message of the cell on which the USIM 1 currently camps are recorded as default DRX1, N1, and Ns1. The default DRX and nB parameters in the SIB message of the cell on which the USIM 2 currently camps are recorded as default DRX2, N2, and Ns2.

Further, if the USIM 1 and the USIM 2 negotiate UE specific DRX with an AMF, UE specific DRX1 and UE specific DRX2 are respectively recorded.

S1002: The terminal calculates POs of the two USIMs in the current cells.

In a possible implementation, if the calculated POs of the USIM 1 and the USIM 2 in the current cells in S1002 are the same, S1003 is performed.

Optionally, if the calculated POs of the USIM 1 and the USIM 2 in the current cells in S1002 are the same, the terminal performs subsequent steps only when determining that both the two USIMs are in a CM-IDLE mode.

S1003: The terminal calculates a new GUTI (new GUTI2) and/or a new specific DRX (new UE specific DRX2) of the USIM 2 based on [N2, Ns2, UE specific DRX2, default DRX2] and [N1, Ns1, UE specific DRX1, default DRX1].

In S1003, the terminal may select new GUTI2 and/or new UE specific DRX2, so that a new PO (a second PO) of the USIM 2 is different from the current PO of the USIM 1.

S1004: The terminal sends a re-registration (registration request) message to an AMF 2 accessed by the USIM 2, where the re-registration request message carries new GUTI2 and/or new UE specific DRX2.

Optionally, S1004, S1005, and S1006 may be performed in sequence, or S1006 may be directly performed after S1004.

S1005: The AMF 2 obtains subscription information of the terminal from a UDM, and determines that the terminal is allowed to perform MUSIM communication.

The subscription information of the terminal is subscription information of a user corresponding to a USIM of the terminal in a PLMN network.

S1006: The AMF 2 sends a registration accept (registration accept) message to the terminal, to indicate that the reported parameter is accepted.

Optionally, the registration accept message may carry an acceptance indication (for example, requested parameters allowed), to indicate that new GUTI2 and/or new UE specific DRX2 are/is accepted by the AMF.

After the terminal receives the registration accept message, the USIM 2 enters the idle (idle) mode.

S1007: The terminal determines, based on new GUTI2 and/or new UE specific DRX2, the new PO of the USIM 2, and monitors a paging signal.

During a network-triggered service request (Network-triggered service request) procedure, S1008 and S1009 are performed.

Specifically, when a network side needs to send data or signaling to the terminal and the USIM 2 is in the idle mode, the USIM 2 needs to be paged, that is, the network-triggered service request procedure is triggered.

For example, when the AMF 2 receives Namf_Communication_N1N2 MessageTransfer from an SMF 2, a service request (Service request) procedure is triggered.

S1008: When paging the USIM 2, the AMF 2 sends a paging message to a RAN 2.

There may be one or more RANs 2.

In a possible implementation, when new GUTI2 and new UE specific DRX2 are calculated in S1003, the paging message carries new UE specific DRX2 and an S-TMSI (recorded as new S-TMSI2) in new GUTI2.

In another possible implementation, when only new GUTI2 is calculated in S1003, the paging message carries UE specific DRX2 and an S-TMSI (recorded as new S-TMSI2) in new GUTI2.

In another possible implementation, when only new UE specific DRX2 is calculated in S1003, the paging message carries new UE specific DRX2 and an S-TMSI (recorded as S-TMSI2) in GUTI2.

S1009: The RAN 2 calculates the PO of the USIM 2 based on the parameters in the paging message, and pages the USIM 2.

Embodiment 2

Figure 11:
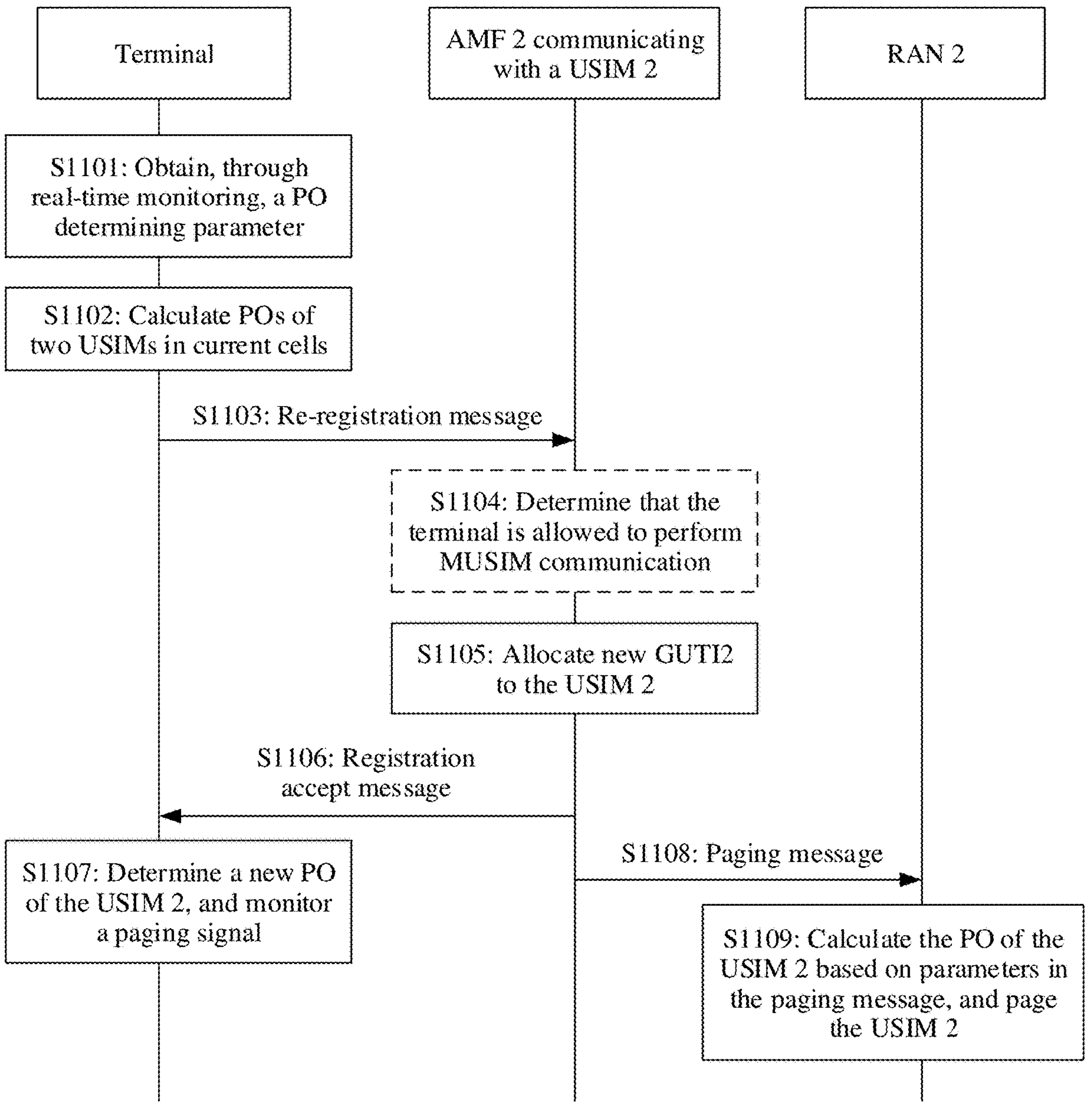
FIG. 11 is a schematic flowchart of a still further method for determining a PO of a terminal according to an embodiment of this application.

FIG. 11 shows still another method for determining a PO of the terminal according to an embodiment of this application. The method may include the following steps.

S1101: The terminal obtains, through real-time monitoring, a PO determining parameter.

For S1101, refer to S1001. Details are not described again.

S1102: The terminal calculates POs of the two USIMs in current cells.

In a possible implementation, if the calculated POs of the USIM 1 and the USIM 2 in the current cells in S1102 are the same, S1103 is performed.

Optionally, if the calculated POs of the USIM 1 and the USIM 2 in the current cells in S1102 are the same, the terminal performs subsequent steps only when determining that both the two USIMs are in a CM-IDLE mode.

S1103: The terminal sends a re-registration (registration request) message to an AMF 2 accessed by the USIM 2, where the re-registration request message carries indication information.

The indication information is used to indicate that POs of at least two USIMs in the terminal are the same, and two USIMs whose POs are the same include a USIM communicating with the AMF 2.

Optionally, S1103, S1104, and S1105 may be performed in sequence, or S1105 may be directly performed after S1103.

S1104: The AMF 2 obtains subscription information of the terminal from a UDM, and determines that the terminal is allowed to perform MUSIM communication.

S1105: The AMF 2 allocates new GUTI2 to the USIM 2.

S1106: The AMF 2 sends a registration accept (registration accept) message to the terminal, where the message carries new GUTI2.

After the terminal receives the registration accept message, the USIM 2 enters the idle (idle) mode.

S1107: The terminal determines, based on new GUTI2 and another unchanged parameter, a new PO of the USIM 2, and monitors a paging signal.

When a network-triggered service request (Network-triggered service request) procedure is triggered, S1108 and S1109 are performed.

S1108: When paging the USIM 2, the AMF 2 sends a paging message to a RAN 2.

There may be one or more RANs 2.

The paging message carries UE specific DRX2 and an S-TMSI (recorded as new S-TMSI2) in new GUTI2.

S1109: The RAN 2 calculates the PO of the USIM 2 based on the parameters in the paging message, and pages the USIM 2.

Embodiment 3

Figure 12:
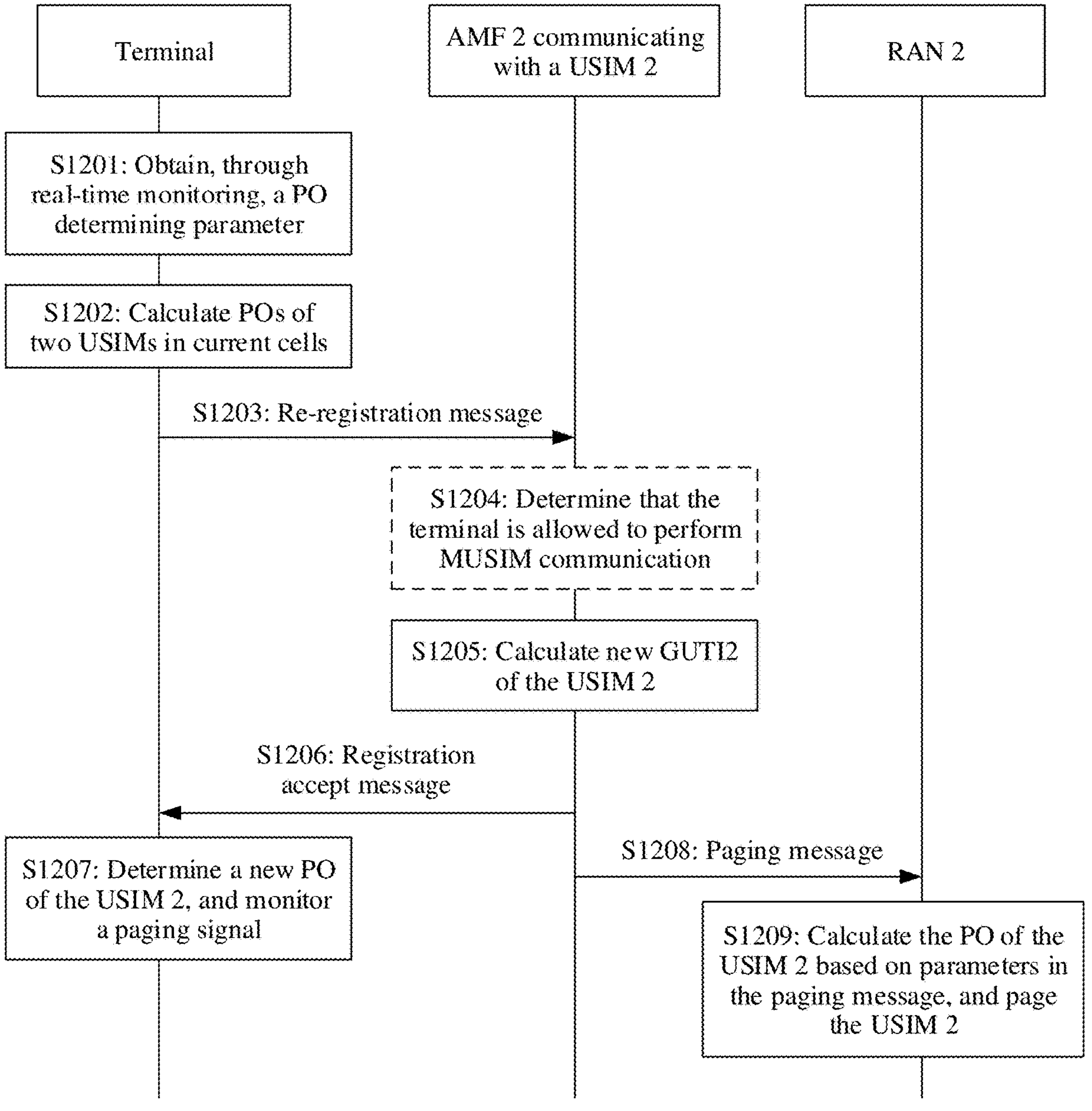
FIG. 12 is a schematic flowchart of a yet further method for determining a PO of a terminal according to an embodiment of this application.

FIG. 12 shows still another method for determining a PO of the terminal according to an embodiment of this application. The method may include the following steps.

S1201: The terminal obtains, through real-time monitoring, a PO determining parameter.

For S1201, refer to S1001. Details are not described again.

S1202: The terminal calculates POs of the two USIMs in current cells.

In a possible implementation, if the calculated POs of the USIM 1 and the USIM 2 in the current cells in S1202 are the same, S1203 is performed.

Optionally, if the calculated POs of the USIM 1 and the USIM 2 in the current cells in S1202 are the same, the terminal performs subsequent steps only when determining that both the two USIMs are in a CM-IDLE mode.

S1203: The terminal sends a re-registration (registration request) message to an AMF 2 accessed by the USIM 2, where the message carries [N2, Ns2, Default DRX2] and [N1, Ns1, UE specific DRX1, Default DRX1].

Optionally, S1203, S1204, and S1205 may be performed in sequence, or S1205 may be directly performed after S1203.

S1204: The AMF 2 obtains subscription information of the terminal from a UDM, and determines that the terminal is allowed to perform MUSIM communication.

S1205: The AMF 2 calculates new GUTI2 of the USIM 2 based on [N2, Ns2, UE specific DRX2, Default DRX2] and [N1, Ns1, UE specific DRX1, Default DRX1].

UE specific DRX2 is information stored in the AMF 2.

S1206: The AMF 2 sends a registration accept (registration accept) message to the terminal, where the message carries new GUTI2.

After the terminal receives the registration accept message, the USIM 2 enters the idle (idle) mode.

S1207: The terminal determines, based on new GUTI2 and another unchanged parameter, a new PO of the USIM 2, and monitors a paging signal.

When a network-triggered service request (Network-triggered service request) procedure is triggered, S1208 and S1209 are performed.

S1208: When paging the USIM 2, the AMF 2 sends a paging message to a RAN 2.

There may be one or more RANs 2.

The paging message carries UE specific DRX2 and an S-TMSI (recorded as new S-TMSI2) in new GUTI2.

S1209: The RAN 2 calculates the PO of the USIM 2 based on the parameters in the paging message, and pages the USIM 2.

Embodiment 4

Figure 13:
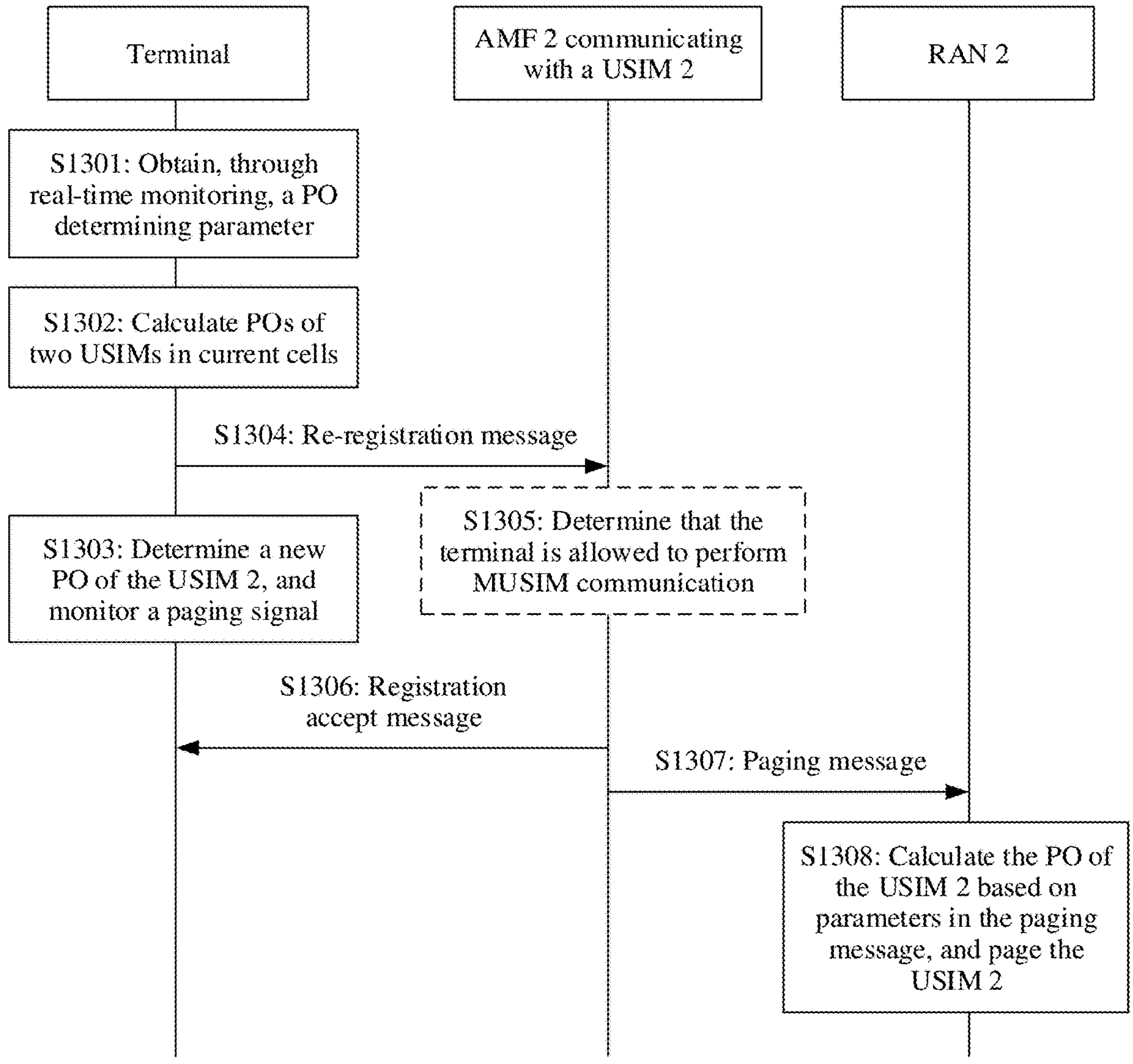
FIG. 13 is a schematic flowchart of a still yet further method for determining a PO of a terminal according to an embodiment of this application.

FIG. 13 shows still another method for determining a PO of the terminal according to an embodiment of this application. The method may include the following steps.

S1301: The terminal obtains, through real-time monitoring, a PO determining parameter.

For S1301, refer to S1001. Details are not described again.

S1302: The terminal calculates POs of the two USIMs in current cells.

In a possible implementation, if the calculated POs of the USIM 1 and the USIM 2 in the current cells in S1302 are the same, S1303 is performed.

Optionally, if the calculated POs of the USIM 1 and the USIM 2 in the current cells in S1302 are the same, the terminal performs subsequent steps only when determining that both the two USIMs are in a CM-IDLE mode.

S1303: The terminal determines, based on GUTI2, UE specific DRX2, default DRX2, and a dedicated algorithm, a new PO of the USIM 2, and monitors a paging signal.

For example, the dedicated algorithm may be as follows:

Frame number SFN of a PF corresponding to a user: (SFN+PF_offset+per-UE-PF_offset) mod T=(T div N)*(UE_ID mod N); and/or a subscript i_s for PO is calculated through table querying: i_s+per-UE-i_s_offset=floor (UE_ID/N) mod Ns.

S1304: The terminal sends a re-registration (registration request) message to an AMF 2 accessed by the USIM 2, where the message carries collision indication information.

Optionally, S1304, S1305, and S1306 may be performed in sequence, or S1306 may be directly performed after S1304.

S1305: The AMF 2 obtains subscription information of the terminal from a UDM, and determines that the terminal is allowed to perform MUSIM communication.

S1306: The AMF 2 sends a registration accept (registration accept) message to the terminal.

After the terminal receives the registration accept message, the USIM 2 enters the idle (idle) mode.

When a network-triggered service request (Network-triggered service request) procedure is triggered, S1307 and S1308 are performed.

S1307: When paging the USIM 2, the AMF 2 sends a paging message to a RAN 2.

There may be one or more RANs 2.

The paging message carries the collision indication information, an S-TMSI (recorded as S-TMSI2) in GUTI2, and UE specific DRX2. The collision indication information is used to indicate an access network device to determine, based on a dedicated algorithm, the second PO of the first USIM, and page the first USIM on the second PO of the first USIM; or the collision indication information is used to indicate that the PO of the first USIM collides with the PO of the second USIM, so that an access network device determines, based on a dedicated algorithm, the second PO of the first USIM, and pages the first USIM on the second PO of the first USIM; or the collision indication information is used to indicate that a PO that is of the first USIM and that corresponds to an S-TMSI in the paging parameter collides with the PO of the second USIM, so that an access network device determines, based on a dedicated algorithm, the second PO of the first USIM, and pages the first USIM on the second PO of the first USIM.

S1308: The RAN 2 uses the foregoing dedicated algorithm based on the collision indication information in the paging message, calculates the PO of the USIM 2 based on the parameters in the paging message, and pages the USIM 2.

It should be noted that an execution sequence of the steps in the method for determining the PO of the terminal provided in embodiments of this application may be configured based on an actual requirement, and only one possible execution sequence is shown in the accompanying drawings in embodiments of this application.

Figure 14:
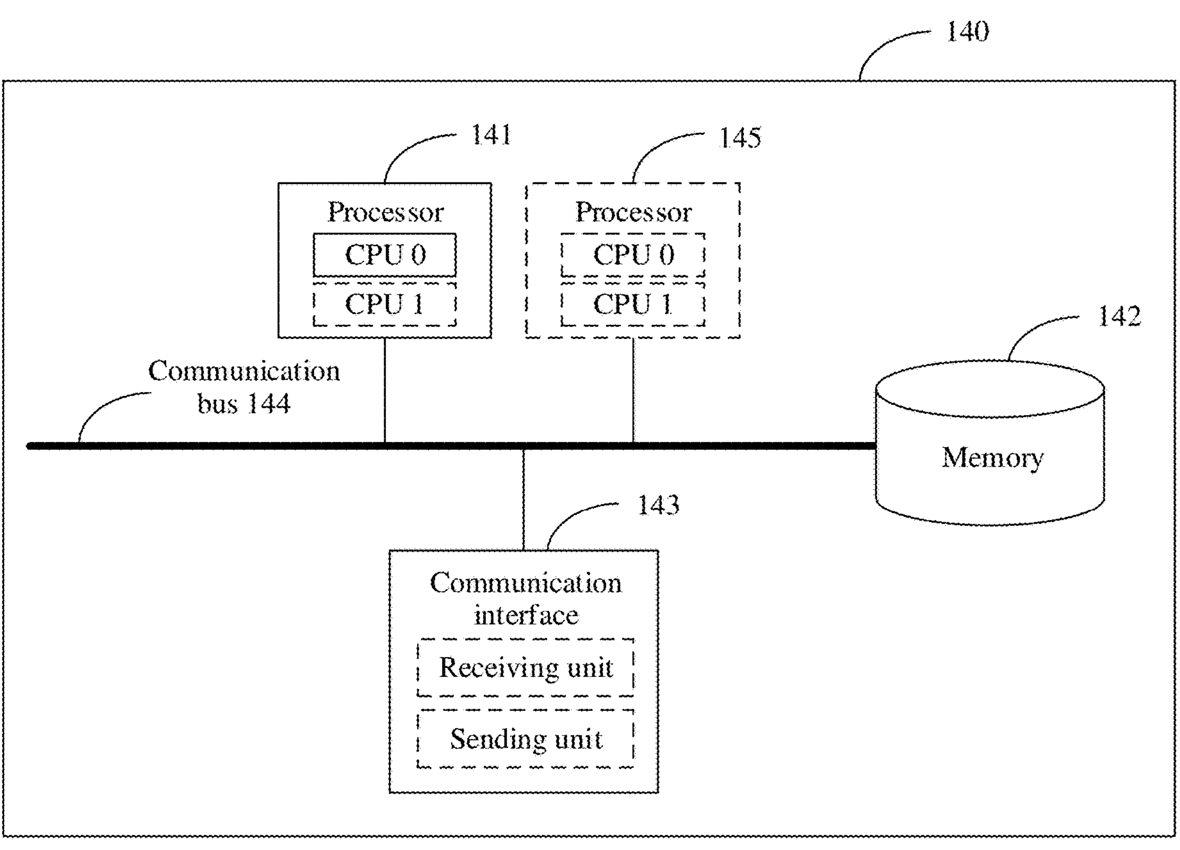
FIG. 14 is a schematic composition diagram of a communication apparatus according to an embodiment of this application.

According to still another aspect, an embodiment of this application provides a communication apparatus. FIG. 14 is a schematic composition diagram of a communication apparatus 140 according to an embodiment of this application. As shown in FIG. 14, the communication apparatus 140 may include at least one processor 141, a memory 142, a communication interface 143, and a communication bus 144. The following specifically describes the components of the communication apparatus 140 with reference to FIG. 14.

The processor 141 may be one processor, or may be a collective name of a plurality of processing elements. For example, the processor 141 may be a central processing unit (central processing unit, CPU) or an application-specific integrated circuit (application-specific integrated circuit, ASIC), or may be one or more integrated circuits, for example, one or more microprocessors (digital signal processor, DSP) or one or more field programmable gate arrays (field programmable gate array, FPGA), configured to implement embodiments of this application.

The processor 141 may perform various functions of a function alias control server by running or executing a software program stored in the memory 142 and invoking data stored in the memory 142. During specific implementation, in an embodiment, the processor 141 may include one or more CPUs, for example, a CPU 0 and a CPU 1 shown in FIG. 14.

During specific implementation, in an embodiment, the communication apparatus 140 may include a plurality of processors, for example, the processor 141 and a processor 145 shown in FIG. 14. Each of the processors may be a single-core (single-CPU) processor or may be a multi-core (multi-CPU) processor. Herein, the processor may be one or more devices, circuits, and/or processing cores configured to process data (for example, computer program instructions).

The memory 142 may be a read-only memory (read-only memory, ROM) or another type of static storage device that can store static information and instructions, or a random access memory (random access memory, RAM) or another type of dynamic storage device that can store information and instructions. The memory 142 may alternatively be an electrically erasable programmable read-only memory (electrically erasable programmable read-only memory, EEPROM), a compact disc read-only memory (compact disc read-only memory, CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium that can be used to carry or store expected program code in a form of instructions or a data structure and that is accessible by a computer, but is not limited thereto. The memory 142 may exist independently, and is connected to the processor 141 through the communication bus 144. The memory 142 may alternatively be integrated with the processor 141. The memory 142 is configured to store a software program for performing the solutions of this application, and the processor 141 controls execution of the software program.

The communication interface 143 is configured to communicate with another device or a communication network, such as an Ethernet, a radio access network (radio access network, RAN), or a wireless local area network (wireless local area networks, WLAN), via any apparatus such as a transceiver. The communication interface 143 may include a receiving unit and a sending unit.

The communication bus 144 may be an industry standard architecture (industry standard architecture, ISA) bus, a peripheral component interconnect (peripheral component interconnect, PCI) bus, an extended industry standard architecture (extended industry standard architecture, EISA) bus, or the like. The bus may be classified into an address bus, a data bus, a control bus, and the like. For ease of representation, only one thick line is used to represent the bus in FIG. 14, but this does not mean that there is only one bus or only one type of bus.

It should be noted that the components shown in FIG. 14 do not constitute a limitation on the communication apparatus. In addition to the components shown in FIG. 14, the communication apparatus may include more or fewer components than those shown in the figure, or some components may be combined, or different component arrangements may be used.

In a possible implementation, the communication apparatus 140 may be a terminal, an apparatus or a chip system deployed in the terminal, or a device used together with the terminal. The terminal includes a first USIM and a second USIM. The processor 141 runs or executes the software program and/or a module stored in the memory 142, and invokes the data stored in the memory 142, to perform the following function:

when a first PO of the first USIM is the same as a PO of the second USIM, sending indication information to a mobility management network element communicating with the first USIM, where the indication information is used to indicate that POs of at least two USIMs in the terminal are the same; receiving a first parameter from the mobility management network element; and determining a second PO of the first USIM based on the first parameter, where the second PO of the first USIM is different from the PO of the second USIM; or when a first PO of the first USIM is the same as a PO of the second USIM, sending a second parameter to a mobility management network element communicating with the first USIM, where the second parameter is used to determine a second PO of the first USIM, and the second PO of the first USIM is different from the PO of the second USIM; and determining the second PO of the first USIM based on the second parameter; or when a first PO of the first USIM is the same as a PO of the second USIM, sending indication information and a second parameter to a mobility management network element communicating with the first USIM, where the indication information is used to indicate that POs of at least two USIMs in the terminal are the same, the second parameter is used to determine a second PO of the first USIM, and the second PO of the first USIM is different from the PO of the second USIM; and determining the second PO of the first USIM based on the second parameter; or when a first PO of the first USIM is the same as a PO of the second USIM, sending indication information to a mobility management network element communicating with the first USIM, where the indication information is used to indicate that POs of at least two USIMs in the terminal are the same; and determining a second PO of the first USIM based on a dedicated algorithm, where the second PO of the first USIM is different from the PO of the second USIM, the first PO of the first USIM is the same as the PO of the second USIM, and the dedicated algorithm is different from an algorithm for determining the first PO of the first USIM; or when a first PO of the first USIM is the same as a PO of the second USIM, sending a second parameter to a mobility management network element communicating with the first USIM; receiving a first parameter from the mobility management network element, where the first parameter is determined based on the second parameter; and determining a second PO of the first USIM based on the first parameter, where the second PO of the first USIM is different from the PO of the second USIM; or when a first PO of the first USIM is the same as a PO of the second USIM, sending an initial parameter to a mobility management network element communicating with the first USIM, where the initial parameter includes a parameter used to determine the first PO of the first USIM and a parameter used to determine the PO of the second USIM; receiving a first parameter from the mobility management network element; and determining a second PO of the first USIM based on the first parameter, where the second PO of the first USIM is different from the PO of the second USIM.

In another possible implementation, the communication apparatus 40 may be a mobility management network element, an apparatus or a chip system deployed in the mobility management network element, or a device used together with the mobility management network element. The mobility management network element communicates with a first USIM in a terminal. The terminal includes the first USIM and a second USIM. The processor 41 runs or executes the software program and/or a module stored in the memory 42, and invokes the data stored in the memory 42, to perform the following function:

receiving indication information from a terminal, where the indication information is used to indicate that POs of at least two USIMs in the terminal are the same, and the at least two USIMs include the first USIM; determining a first parameter after receiving the indication information; sending the first parameter to the terminal, where the first parameter is used to determine a second PO of the first USIM, and the second PO of the first USIM is different from a PO of the second USIM in the terminal; determining a paging parameter based on the first parameter, where the paging parameter is used to determine the second PO of the first USIM; and sending the paging parameter to an access network device when paging the first USIM; or receiving a second parameter from the terminal; determining that POs of at least two USIMs in the terminal are the same, where the at least two USIMs include the first USIM; determining a paging parameter of the first USIM based on the second parameter; and sending the paging parameter to an access network device when paging the first USIM, where the paging parameter is used to determine a PO of the first USIM; or receiving indication information and a second parameter from the terminal, where the indication information is used to indicate that POs of at least two USIMs in the terminal are the same, and the at least two USIMs include the first USIM; determining a paging parameter of the first USIM based on the second parameter; and when needing to page the first USIM of the terminal, sending the paging parameter to an access network device, where the paging parameter is used to determine a PO of the first USIM; or receiving indication information from the terminal, where the indication information is used to indicate that POs of at least two USIMs in the terminal are the same, and the at least two USIMs include the first USIM; determining a paging parameter based on an initial parameter, where the paging parameter is used to determine a second PO of the first USIM; sending collision indication information and the paging parameter to an access network device when paging the first USIM, where the collision indication information is used to indicate the access network device to determine, based on a dedicated algorithm, the second PO of the first USIM, and page the first USIM on the second PO of the first USIM; or the collision indication information is used to indicate that a PO of the first USIM collides with a PO of the second USIM, so that the access network device determines, based on a dedicated algorithm, the second PO of the first USIM, and pages the first USIM on the second PO of the first USIM; or the collision indication information is used to indicate that a PO that is of the first USIM and that corresponds to an S-TMSI in the paging parameter collides with a PO of the second USIM, so that the access network device determines, based on a dedicated algorithm, the second PO of the first USIM, and pages the first USIM on the second PO of the first USIM; the second PO of the first USIM is different from the PO of the second USIM, a first PO of the first USIM is the same as the PO of the second USIM, and the dedicated algorithm is different from an algorithm for determining the first PO of the first USIM; or receiving a second parameter from the terminal; determining a first parameter based on the second parameter; sending the first parameter to the terminal, where the first parameter is used to determine a second PO of the first USIM, and the second PO of the first USIM is different from a PO of the second USIM in the terminal; determining a paging parameter based on the first parameter, where the paging parameter is used to determine the second PO of the first USIM; and sending the paging parameter to an access network device when paging the first USIM; or receiving an initial parameter from the terminal, where the initial parameter includes a parameter used to determine a first PO of the first USIM and a parameter used to determine a PO of the second USIM; determining a first parameter based on the initial parameter; sending the first parameter to the terminal, where the first parameter is used to determine a second PO of the first USIM, and the second PO of the first USIM is different from the PO of the second USIM in the terminal; determining a paging parameter based on the first parameter, where the paging parameter is used to determine the second PO of the first USIM; and sending the paging parameter to an access network device when paging the first USIM.

In still another possible implementation, the communication apparatus 140 may be an access network device, an apparatus or a chip system deployed in the access network device, or a device used together with the access network device. A first USIM in a terminal accesses the access network device. The terminal includes the first USIM and a second USIM. The processor 141 runs or executes the software program and/or a module stored in the memory 142, and invokes the data stored in the memory 142, to perform the following function:

receiving a paging parameter and collision indication information from a mobility management network element, where a first PO of the first USIM is the same as a PO of the second USIM, and a dedicated algorithm is different from an algorithm used by the access network device to determine the first PO of the first USIM; determining a second PO of the first USIM based on the dedicated algorithm and the paging parameter; and paging the first USIM based on the second PO; for indication content of the collision indication information, refer to the foregoing descriptions; or receiving a paging parameter from a mobility management network element; determining a second PO of a first USIM based on the paging parameter; and paging the first USIM based on the second PO.

It should be noted that, for a specific implementation of the communication apparatus 140, refer to the descriptions in the foregoing method embodiments. Details are not described herein again.

In the foregoing embodiments provided in this application, the method provided in embodiments of this application is separately described from perspectives of working principles of a terminal, a mobility management network element, and an access network device. To implement the functions in the foregoing methods provided in embodiments of this application, the terminal, the mobility management network element, and the access network device may include a hardware structure and/or a software module, and implement the foregoing functions in a form of the hardware structure, the software module, or a combination of the hardware structure and the software module. Whether a specific function of the foregoing functions is performed by using the hardware structure, the software module, or the combination of the hardware structure and the software module depends on a particular application and a implementation constraint of the technical solution.

Division into modules in embodiments of this application is an example, is only logical function division, and may be other division during actual implementation. In addition, functional modules in embodiments of this application may be integrated into one processor, or may exist alone physically, or two or more modules may be integrated into one module. The integrated module may be implemented in a form of hardware, or may be implemented in a form of a software functional module.

Figure 15:
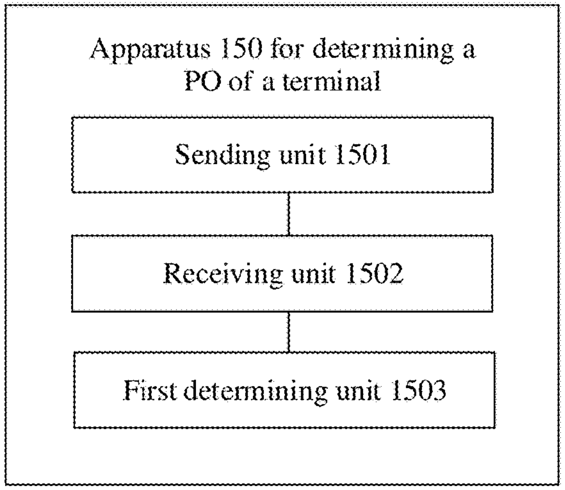
FIG. 15 is a schematic composition diagram of an apparatus for determining a PO of a terminal according to an embodiment of this application.

When each functional module is obtained through division corresponding to each function, FIG. 15 shows an apparatus 150 for determining a PO of a terminal according to an embodiment of this application. The apparatus is configured to implement a function of the terminal in the foregoing method. The apparatus 150 for determining the PO of the terminal may be the terminal, may be an apparatus in the terminal, or may be an apparatus that can be used together with a terminal. The apparatus 150 for determining the PO of the terminal may be a chip system. In this embodiment of this application, the chip system may include a chip; or may include a chip and another discrete component. As shown in FIG. 15, the apparatus 150 for determining the PO of the terminal may include a sending unit 1501, a receiving unit 1502, and a first determining unit 1503. The sending unit 1501 is configured to perform steps S501 and S502*a* in FIG. 5 or FIG. 6, step S701 in FIG. 7, step S801 in FIG. 8, or step S901 in FIG. 9. The receiving unit 1502 is configured to perform step S505 in FIG. 5 or FIG. 6, or step S705 in FIG. 7. The first determining unit 1503 is configured to perform step S506 in FIG. 5 or FIG. 6, step S706 in FIG. 7, step S802 in FIG. 8, or step S902 in FIG. 9. All related content of the steps in the foregoing method embodiments may be cited in function descriptions of corresponding functional modules. Details are not described herein again.

Figure 16:
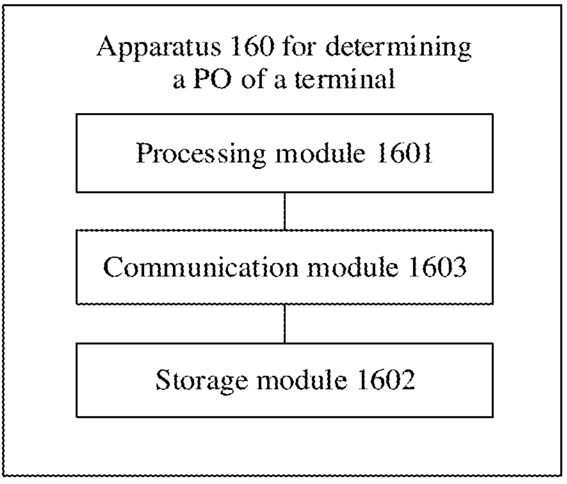
FIG. 16 is a schematic composition diagram of another apparatus for determining a PO of a terminal according to an embodiment of this application.

When an integrated unit is used, FIG. 16 shows an apparatus 160 for determining a PO of a terminal according to an embodiment of this application. The apparatus is configured to implement a function of the terminal in the foregoing method. The apparatus 160 for determining the PO of the terminal may be the terminal, may be an apparatus in the terminal, or may be an apparatus that can be used together with a terminal. The apparatus 160 for determining the PO of the terminal may be a chip system. In this embodiment of this application, the chip system may include a chip; or may include a chip and another discrete component. As shown in FIG. 16, the apparatus 160 for determining the PO of the terminal includes at least one processing module 1601, configured to implement a function of the terminal in the methods provided in embodiments of this application. For example, the processing module 1601 may be configured to perform step S506 in FIG. 5 or FIG. 6, step S706 in FIG. 7, step S802 in FIG. 8, or step S902 in FIG. 9. For details, refer to detailed descriptions in the method examples. Details are not described herein again.

The apparatus 160 for determining the PO of the terminal may further include at least one storage module 1602, configured to store program instructions and/or data. The storage module 1602 is coupled to the processing module 1601. The coupling in this embodiment of this application is indirect coupling or a communication connection between apparatuses, units, or modules, may be in an electrical form, a mechanical form, or another form, and is used for information exchange between the apparatuses, the units, or the modules. The processing module 1601 may cooperate with the storage module 1602. The processing module 1601 may execute the program instruction stored in the storage module 1602. At least one of the at least one storage module may be included in the processing module.

The apparatus 160 for determining the PO of the terminal may further include a communication module 1603, configured to communicate with another device through a transmission medium, so that the apparatus 160 for determining the PO of the terminal may communicate with another device. The communication module 1603 is used by the apparatus to communicate with the another device. For example, the processor 1601 performs steps S501, S502*a*, and S505 in FIG. 5 or FIG. 6, steps S701 and S705 in FIG. 7, step S801 in FIG. 8, or step S901 in FIG. 9 through the communication interface 1603.

When the processing module 1601 is a processor, the storage module 1602 is a memory, and the communication module 1603 is a communication interface, the apparatus 160 for determining the PO of the terminal in FIG. 16 in this embodiment of this application may be the communication apparatus 140 shown in FIG. 14.

As described above, the apparatus 150 for determining the PO of the terminal or the apparatus 160 for determining the PO of the terminal provided in embodiments of this application may be configured to implement functions of the terminal in the methods implemented in the foregoing embodiments of this application. For ease of description, only a part related to embodiments of this application is shown. For specific technical details not disclosed, refer to embodiments of this application.

Figure 17:
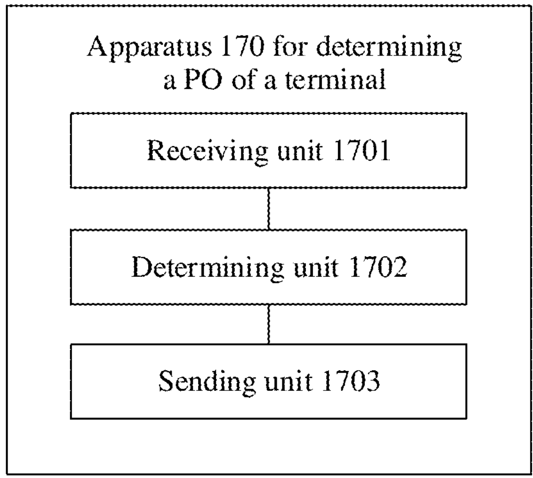
FIG. 17 is a schematic composition diagram of still another apparatus for determining a PO of a terminal according to an embodiment of this application.

When each functional module is obtained through division corresponding to each function, FIG. 17 shows an apparatus 170 for determining a PO of a terminal according to an embodiment of this application. The apparatus is configured to implement a function of the mobility management network element in the foregoing method. The apparatus 170 for determining the PO of the terminal may be a mobility management network element, may be an apparatus in the mobility management network element, or may be an apparatus that can be used together with the mobility management network element. The apparatus 170 for determining the PO of the terminal may be a chip system. In this embodiment of this application, the chip system may include a chip; or may include a chip and another discrete component. As shown in FIG. 17, the apparatus 170 for determining the PO of the terminal may include a receiving unit 1701, a determining unit 1702, and a sending unit 1703. The receiving unit 1701 is configured to perform steps S502, S502*b*, and S505 in FIG. 5 or FIG. 6, step S702 in FIG. 7, step S803 in FIG. 8, or step S903 in FIG. 9. The determining unit 1702 is configured to perform steps S503, S503*a*, and S507 in FIG. 5 or FIG. 6, steps S703 and S707 in FIG. 7, steps S804 and S805 in FIG. 8, or step S904 in FIG. 9. The sending unit 1703 is configured to perform steps S504 and S508 in FIG. 5 or FIG. 6, steps S704 and S708 in FIG. 7, step S806 in FIG. 8, or step S905 in FIG. 9. All related content of the steps in the foregoing method embodiments may be cited in function descriptions of corresponding functional modules. Details are not described herein again.

Figure 18:
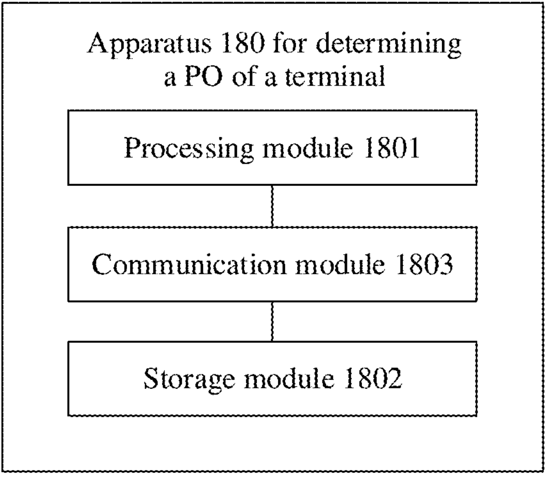
FIG. 18 is a schematic composition diagram of yet another apparatus for determining a PO of a terminal according to an embodiment of this application.

When an integrated unit is used, FIG. 18 shows an apparatus 180 for determining a PO of a terminal according to an embodiment of this application. The apparatus is configured to implement a function of the mobility management network element in the foregoing method. The apparatus 180 for determining the PO of the terminal may be a mobility management network element, may be an apparatus in the mobility management network element, or may be an apparatus that can be used together with the mobility management network element. The apparatus 180 for determining the PO of the terminal may be a chip system. In this embodiment of this application, the chip system may include a chip; or may include a chip and another discrete component. The apparatus 180 for determining the PO of the terminal includes at least one processing module 1801, configured to implement a function of the mobility management network element in the methods provided in embodiments of this application. For example, the processing module 1801 may be configured to perform steps S503, S503*a*, and S507 in FIG. 5 or FIG. 6, steps S703 and S707 in FIG. 7, steps S804 and S805 in FIG. 8, or step S904 in FIG. 9. For details, refer to detailed descriptions in the method examples. Details are not described herein again.

The apparatus 180 for determining the PO of the terminal may further include at least one storage module 1802, configured to store program instructions and/or data. The storage module 1802 is coupled to the processing module 1801. The coupling in this embodiment of this application is indirect coupling or a communication connection between apparatuses, units, or modules, may be in an electrical form, a mechanical form, or another form, and is used for information exchange between the apparatuses, the units, or the modules. The processing module 1801 may cooperate with the storage module 1802. The processing module 1801 may execute the program instructions stored in the storage module 1802. At least one of the at least one storage module may be included in the processing module.

The apparatus 180 for determining the PO of the terminal may further include a communication module 1803, configured to communicate with another device through a transmission medium, so that the apparatus 180 for determining the PO of the terminal may communicate with another device. The communication module 1803 is used by the apparatus to communicate with the another device. For example, the processor 1801 performs steps S502, S502*b*, S504, S505, and S508 in FIG. 5 or FIG. 6, steps S702, S704, and S708 in FIG. 7, steps S803 and S806 in FIG. 8, or steps S903 and S905 in FIG. 9 through the communication interface 1803.

When the processing module 1801 is a processor, the storage module 1802 is a memory, and the communication module 1803 is a communication interface, the apparatus 180 for determining the PO of the terminal in FIG. 18 in this embodiment of this application may be the communication apparatus 140 shown in FIG. 14.

As described above, the apparatus 170 for determining the PO of the terminal or the apparatus 180 for determining the PO of the terminal provided in embodiments of this application may be configured to implement functions of the mobility management network element in the methods implemented in the foregoing embodiments of this application. For ease of description, only a part related to embodiments of this application is shown. For specific technical details not disclosed, refer to embodiments of this application.

Figure 19:
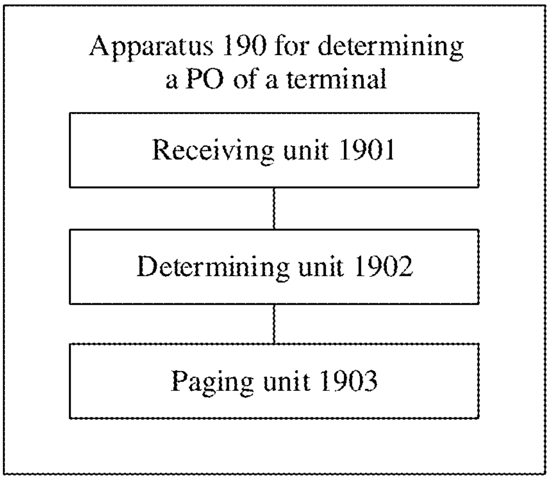
FIG. 19 is a schematic composition diagram of still yet another apparatus for determining a PO of a terminal according to an embodiment of this application.

When each functional module is obtained through division corresponding to each function, FIG. 19 shows an apparatus 190 for determining a PO of a terminal according to an embodiment of this application. The apparatus is configured to implement a function of the access network device in the foregoing method. The apparatus 190 for determining the PO of the terminal may be an access network device, may be an apparatus in the access network device, or may be an apparatus that can be used together with the access network device. The apparatus 190 for determining the PO of the terminal may be a chip system. In this embodiment of this application, the chip system may include a chip; or may include a chip and another discrete component. As shown in FIG. 19, the apparatus 190 for determining the PO of the terminal may include a receiving unit 1901, a determining unit 1902, and a paging unit 1903. The receiving unit 1901 is configured to perform step S509 in FIG. 5 or FIG. 6, step S709 in FIG. 7, step S807 in FIG. 8, or step S906 in FIG. 9. The determining unit 1902 is configured to perform step S510 in FIG. 5 or FIG. 6, step S710 in FIG. 7, step S808 in FIG. 8, step S907 in FIG. 9. The paging unit 1903 is configured to perform step S510 in FIG. 5 or FIG. 6, step S710 in FIG. 7, step S808 in FIG. 8, or step S908 in FIG. 9. All related content of the steps in the foregoing method embodiments may be cited in function descriptions of corresponding functional modules. Details are not described herein again.

Figure 20:
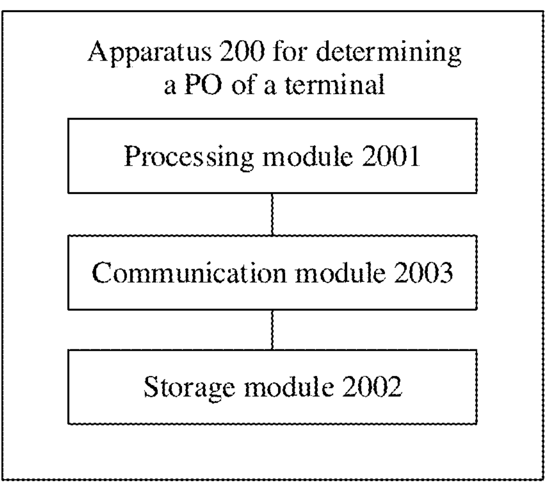
FIG. 20 is a schematic composition diagram of a further apparatus for determining a PO of a terminal according to an embodiment of this application.

When an integrated unit is used, FIG. 20 shows an apparatus 20 for determining a PO of a terminal according to an embodiment of this application. The apparatus is configured to implement a function of the access network device in the foregoing method. The apparatus 190 for determining the PO of the terminal may be an access network device, may be an apparatus in the access network device, or may be an apparatus that can be used together with the access network device. The apparatus 190 for determining the PO of the terminal may be a chip system. In this embodiment of this application, the chip system may include a chip; or may include a chip and another discrete component. The apparatus 20 for determining the PO of the terminal includes at least one processing module 2001, configured to implement a function of the access network device in the methods provided in embodiments of this application. For example, the processing module 2001 may be configured to perform step S510 in FIG. 5 or FIG. 6, step S710 in FIG. 7, step S808 in FIG. 8, or steps S907 and S908 in FIG. 9. For details, refer to detailed descriptions in the method examples. Details are not described herein again.

The apparatus 200 for determining the PO of the terminal may further include at least one storage module 2002, configured to store program instructions and/or data. The storage module 2002 is coupled to the processing module 2001. The coupling in this embodiment of this application is indirect coupling or a communication connection between apparatuses, units, or modules, may be in an electrical form, a mechanical form, or another form, and is used for information exchange between the apparatuses, the units, or the modules. The processing module 2001 may cooperate with the storage module 2002. The processing module 2001 may execute the program instructions stored in the storage module 2002. At least one of the at least one storage module may be included in the processing module.

The apparatus 200 for determining the PO of the terminal may further include a communication module 2003, configured to communicate with another device through a transmission medium, so that the apparatus 200 for determining the PO of the terminal may communicate with another device. The communication module 2003 is used by the apparatus to communicate with the another device. For example, the processor 2001 performs step S509 in FIG. 5 or FIG. 6, step S709 in FIG. 7, step S807 in FIG. 8, or step S906 in FIG. 9 through the communication interface 2003.

When the processing module 2001 is a processor, the storage module 2002 is a memory, and the communication module 2003 is a communication interface, the apparatus 200 for determining the PO of the terminal in FIG. 20 in this embodiment of this application may be the communication apparatus 140 shown in FIG. 14.

As described above, the apparatus 190 for determining the PO of the terminal or the apparatus 200 for determining the PO of the terminal provided in embodiments of this application may be configured to implement functions of the access network device in the methods implemented in the foregoing embodiments of this application. For ease of description, only a part related to embodiments of this application is shown. For specific technical details not disclosed, refer to embodiments of this application.

According to still another aspect, an embodiment of this application provides a system for determining a PO of a terminal. The system for determining the PO of the terminal includes a first communication apparatus and a second communication apparatus. The first communication apparatus may implement a function of the terminal. The second communication apparatus may implement a function of a mobility management network element. For example, the first communication apparatus is the terminal described in embodiments of this application, and the second communication apparatus is the mobility management network element described in embodiments of this application.

In another form of this embodiment, a computer-readable storage medium is provided. The computer-readable storage medium stores instructions. When the instructions are executed, the methods in the foregoing method embodiments are performed.

In another form of this embodiment, a computer program product including instructions is provided. When the instructions are executed, the methods in the foregoing method embodiments are performed.

An embodiment of this application further provides a chip system. The chip system includes a processor, configured to implement the technical methods in embodiments of the present invention. In a possible implementation, the chip system further includes a memory, configured to store program instructions and/or data that are/is necessary for the communication device in embodiments of the present invention. In a possible implementation, the chip system further includes a memory, configured to enable the processor to invoke application program code stored in the memory. The chip system may include one or more chips, or may include a chip and another discrete component. This is not specifically limited in embodiments of this application.

Method or algorithm steps described in combination with the content disclosed in this application may be implemented by hardware, or may be implemented by a processor by executing software instructions. The software instructions may include a corresponding software module. The software module may be stored in a RAM, a flash memory, a ROM, an erasable programmable read-only memory (erasable programmable ROM, EPROM), an electrically erasable programmable read-only memory (electrically EPROM, EEPROM), a register, a hard disk, a removable hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may alternatively be a component of the processor. The processor and the storage medium may be located in an ASIC. In addition, the ASIC may be located in a core network interface device. Certainly, the processor and the storage medium may alternatively exist in the core network interface device as discrete components. Alternatively, the memory may be coupled to the processor. For example, the memory may exist independently, and is connected to the processor through a bus. The memory may alternatively be integrated with the processor. The memory may be configured to store application program code for executing the technical solutions provided in embodiments of this application, and the processor controls the execution. The processor is configured to execute the application program code stored in the memory, to implement the technical solutions provided in embodiments of this application.

The foregoing descriptions about implementations allow a person skilled in the art to understand that, for the purpose of convenient and brief description, division into the foregoing functional modules is used as an example for illustration. During actual application, the foregoing functions can be allocated to different functional modules and implemented based on a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiments are merely examples. For example, division into the modules or units is merely logical function division, and may be other division during actual implementation. For example, a plurality of units or components may be combined or may be integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate components may or may not be physically separate, and components displayed as units may be one or more physical units, in other words, may be located in one place, or may be distributed on a plurality of different places. Some or all of the units may be selected based on actual requirements to achieve the objectives of the solutions in the embodiments.

In addition, functional units in embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software function unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the methods in embodiments of this application. The foregoing storage medium includes any medium that can store program code, such as a USB flash drive, a removable hard disk, a ROM, a RAM, a magnetic disk, or an optical disc.

The foregoing description is merely a specific implementation of this application, but is not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method for determining a paging occasion (PO) of a terminal, wherein the terminal comprises a first universal subscriber identity module (USIM) and a second USIM, the method is performed by a communication apparatus, wherein the communication apparatus is the terminal, or the communication apparatus is an apparatus or a chip system deployed in the terminal, and the method comprises:

only in response to a first PO of the first USIM being the same as a PO of the second USIM, sending indication information to a mobility management network element communicating with the first USIM, wherein the indication information is used to indicate that POs of at least two USIMs in the terminal are the same;

receiving a first parameter from the mobility management network element; and determining a second PO of the first USIM based on the first parameter, wherein the second PO of the first USIM is different from the PO of the second USIM.

2. The method according to claim 1, wherein the method further comprises:

sending an initial parameter to the mobility management network element, wherein the initial parameter comprises a second parameter used to determine the first PO of the first USIM and a third parameter used to determine the PO of the second USIM.

3. The method according to claim 1, wherein before the sending the indication information to the mobility management network element communicating with the first USIM, the method further comprises:

determining that both the first USIM and the second USIM are in an idle mode.

4. The method according to claim 1, wherein the indication information is used to indicate that the first PO of the first USIM is the same as the PO of the second USIM.

5. The method according to claim 1, wherein the paging parameter comprises one or more of a short temporary mobile subscriber identity (S-TMSI) or a discontinuous reception (DRX) parameter.

6. The method according to claim 1, wherein the indication information comprises an initial parameter, the initial parameter comprises a globally unique temporary user equipment identity (GUTI), and the first parameter comprises a GUTI different from the GUTI in the indication information.

7. An apparatus for determining a paging occasion (PO) of a terminal, wherein the terminal comprises a first universal subscriber identity module (USIM) and a second USIM, the apparatus comprising:

a processor; and a computer-readable storage medium having instructions stored thereon that, when executed by the processor, cause the apparatus to:

only in response to a first PO of the first USIM being the same as a PO of the second USIM, send indication information to a mobility management network element communicating with the first USIM, wherein the indication information is used to indicate that POs of at least two USIMs in the terminal are the same;

receive a first parameter from the mobility management network element; and determine a second PO of the first USIM based on the first parameter, wherein the second PO of the first USIM is different from the PO of the second USIM.

8. The apparatus according to claim 7, wherein the apparatus is further caused to:

send an initial parameter to the mobility management network element, wherein the initial parameter comprises a second parameter used to determine the first PO of the first USIM and a third parameter used to determine the PO of the second USIM.

9. The apparatus according to claim 7, wherein the apparatus is further caused to:

before sending the indication information to the mobility management network element communicating with the first USIM, determine that both the first USIM and the second USIM are in an idle mode.

10. The apparatus according to claim 7, wherein the indication information is used to indicate that the first PO of the first USIM is the same as the PO of the second USIM.

11. The apparatus according to claim 7, wherein the apparatus is the terminal.

12. The apparatus according to claim 7, wherein the apparatus is a chip included in the terminal.

13. The apparatus according to claim 7, wherein the paging parameter comprises one or more of a short temporary mobile subscriber identity (S-TMSI) or a discontinuous reception (DRX) parameter.

14. The apparatus according to claim 7, wherein the indication information comprises an initial parameter, the initial parameter comprises a globally unique temporary user equipment identity (GUTI), and the first parameter comprises a GUTI different from the GUTI in the indication information.

15. A non-transitory computer-readable storage medium having instructions stored thereon that, when executed by a processor, cause an apparatus to:

only in response to a first paging occasion (PO) of the first universal subscriber identity module (USIM) being the same as a PO of a second USIM, send indication information to a mobility management network element communicating with the first USIM, wherein the indication information is used to indicate that POs of at least two USIMs in a terminal are the same;

receive a first parameter from the mobility management network element; and determine a second PO of the first USIM based on the first parameter, wherein the second PO of the first USIM is different from the PO of the second USIM.

16. The non-transitory computer-readable storage medium according to claim 15, wherein the apparatus is further caused to:

send an initial parameter to the mobility management network element, wherein the initial parameter comprises a second parameter used to determine the first PO of the first USIM and a third parameter used to determine the PO of the second USIM.

17. The non-transitory computer-readable storage medium according to claim 15, wherein before the sending the indication information to the mobility management network element communicating with the first USIM, the apparatus is further caused to:

determine that both the first USIM and the second USIM are in an idle mode.

18. The non-transitory computer-readable storage medium according to claim 15, wherein the indication information is used to indicate that the first PO of the first USIM is the same as the PO of the second USIM.

19. The non-transitory computer-readable storage medium according to claim 15, wherein the paging parameter comprises one or more of a short temporary mobile subscriber identity (S-TMSI) or a discontinuous reception (DRX) parameter.

20. The non-transitory computer-readable storage medium according to claim 15, wherein the indication information comprises an initial parameter, the initial parameter comprises a globally unique temporary user equipment identity (GUTI), and the first parameter comprises a GUTI different from the GUTI in the indication information.

* * * * *